United States Patent
Matsushita et al.

(10) Patent No.: US 12,405,719 B2
(45) Date of Patent: Sep. 2, 2025

(54) SOFTWARE PARAMETER MANAGEMENT THROUGH A UNIVERSAL INTERFACE

(71) Applicant: Taiwan Semiconductor Manufacturing Company, Ltd., Hsinchu (TW)

(72) Inventors: Nozomu Matsushita, Tokyo (JP); Katsurou Hayashi, Tokyo (JP); Yasuko Andoh, Tokyo (JP)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 41 days.

(21) Appl. No.: 18/297,421

(22) Filed: Apr. 7, 2023

(65) Prior Publication Data

US 2024/0338115 A1    Oct. 10, 2024

(51) Int. Cl.
*G06F 3/04847* (2022.01)
*G06F 3/04845* (2022.01)

(52) U.S. Cl.
CPC ...... *G06F 3/04847* (2013.01); *G06F 3/04845* (2013.01)

(58) Field of Classification Search
CPC . G06F 3/04847; G06F 3/0484; G06F 3/04845
USPC ................................. 715/764, 771
See application file for complete search history.

(56) References Cited

U.S. PATENT DOCUMENTS

| | | | | |
|---|---|---|---|---|
| 5,526,268 | A * | 6/1996 | Tkacs | G05B 23/0267 704/8 |
| 7,249,327 | B2 | 7/2007 | Nelson | |
| 11,137,904 | B1 | 10/2021 | Tyler | |
| 2004/0268306 | A1* | 12/2004 | Cheng | G06F 40/154 717/114 |

(Continued)

FOREIGN PATENT DOCUMENTS

| | | |
|---|---|---|
| JP | 2014219811 A | 11/2014 |
| JP | 2018073016 A | 5/2018 |
| WO | 2019234736 A1 | 12/2019 |

OTHER PUBLICATIONS

Mell et al., "The NIST Definition of Cloud Computing", National Institute of Standards and Technology, Special Publication 800-145, Sep. 2011, pp. 1-7.

*Primary Examiner* — Hwei-Min Lu
(74) *Attorney, Agent, or Firm* — Harrity & Harrity, LLP

(57) ABSTRACT

Some implementations described herein provide techniques and apparatuses for software parameter management through a universal interface. The techniques and apparatuses include a user device including a universal parameter management application. The user device may receive multiple sets of changeable parameters that may be provided to the user device using different formats, different machine languages, and/or different language scripts. The universal parameter management application may translate the multiple sets of changeable parameters into a common format, common machine language, and/or common language script. The user device may then provide each of the multiple (Continued)

sets through a common, changeable graphical representation of the changeable parameters on a graphical user interface of the device. The user may change each of the multiple sets of changeable parameters through an input that changes the common, changeable graphical representation.

20 Claims, 16 Drawing Sheets

(56) References Cited

U.S. PATENT DOCUMENTS

| | | | | |
|---|---|---|---|---|
| 2007/0139441 | A1* | 6/2007 | Lucas | G06Q 50/04 |
| | | | | 345/619 |
| 2007/0168060 | A1* | 7/2007 | Nixon | G06F 9/4488 |
| | | | | 700/83 |
| 2008/0120565 | A1* | 5/2008 | Stiso | G06F 3/04847 |
| | | | | 707/999.102 |
| 2009/0049389 | A1 | 2/2009 | Kuzmanovic | |
| 2009/0245156 | A1* | 10/2009 | Murakami | H04B 7/15528 |
| | | | | 370/312 |
| 2011/0193788 | A1* | 8/2011 | King | G06F 3/017 |
| | | | | 345/173 |
| 2012/0221351 | A1* | 8/2012 | Bhattacharya | G06F 16/3326 |
| | | | | 707/723 |
| 2013/0311340 | A1* | 11/2013 | Krishnan | G06Q 30/0633 |
| | | | | 705/27.2 |
| 2016/0077725 | A1* | 3/2016 | Maeda | G06F 3/04883 |
| | | | | 715/833 |
| 2019/0095255 | A1* | 3/2019 | Anima | G06F 40/18 |
| 2019/0096101 | A1* | 3/2019 | De Wever | G06F 3/04855 |
| 2019/0102076 | A1* | 4/2019 | Naidoo | G09G 5/14 |
| 2021/0103840 | A1* | 4/2021 | Kwong | G06N 20/00 |
| 2022/0261140 | A1* | 8/2022 | Navarro | G06F 3/0486 |

* cited by examiner

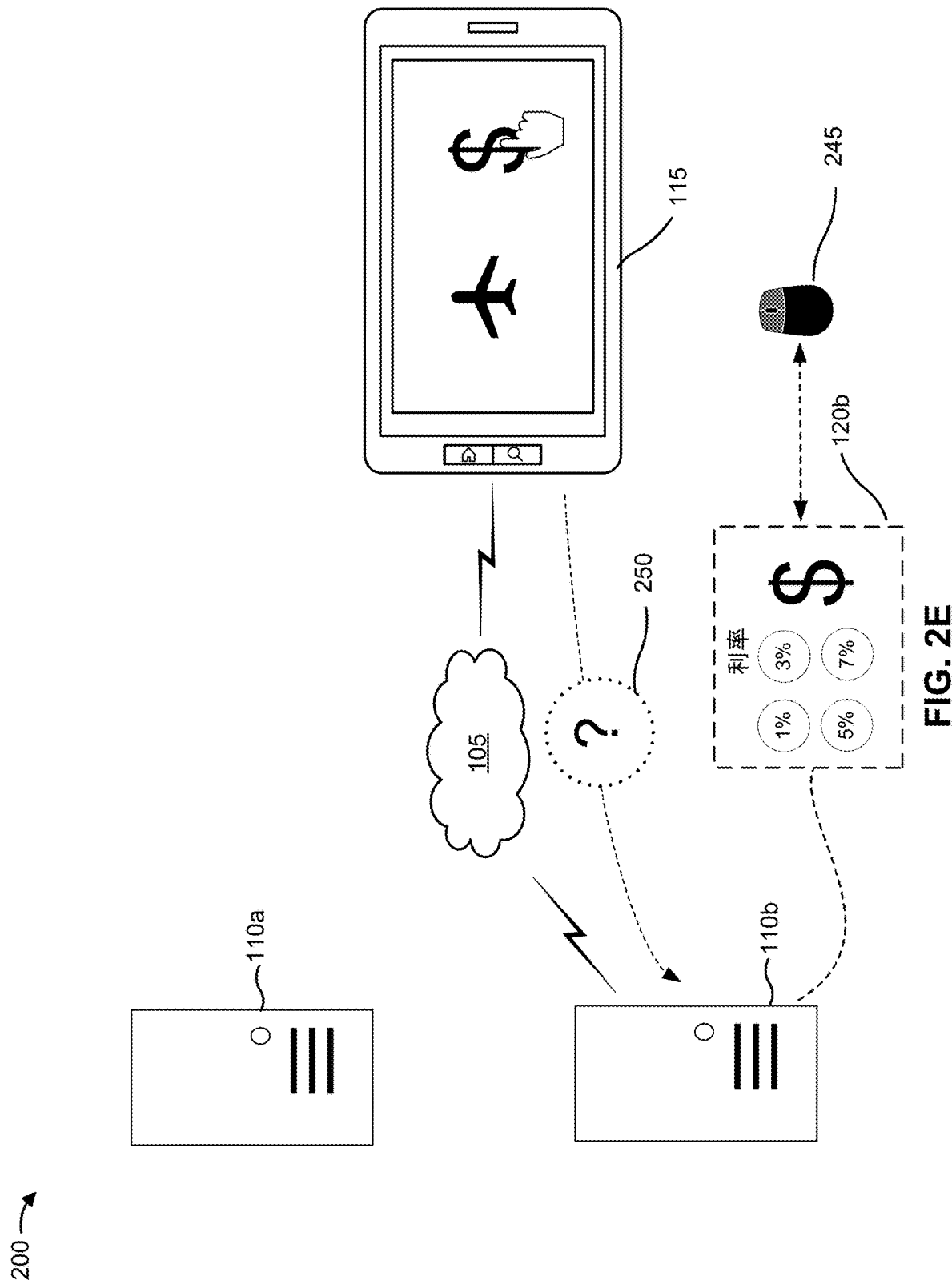

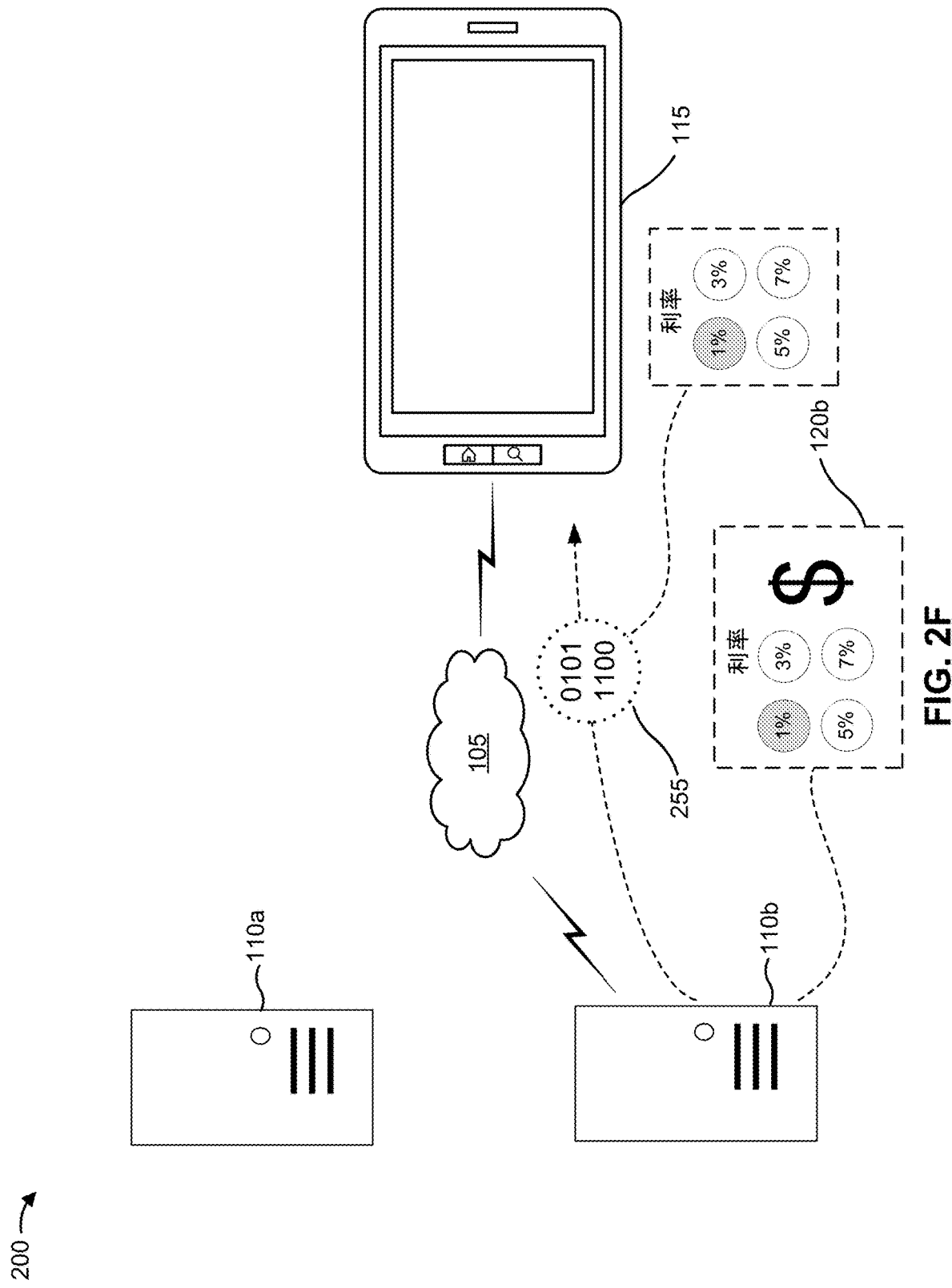

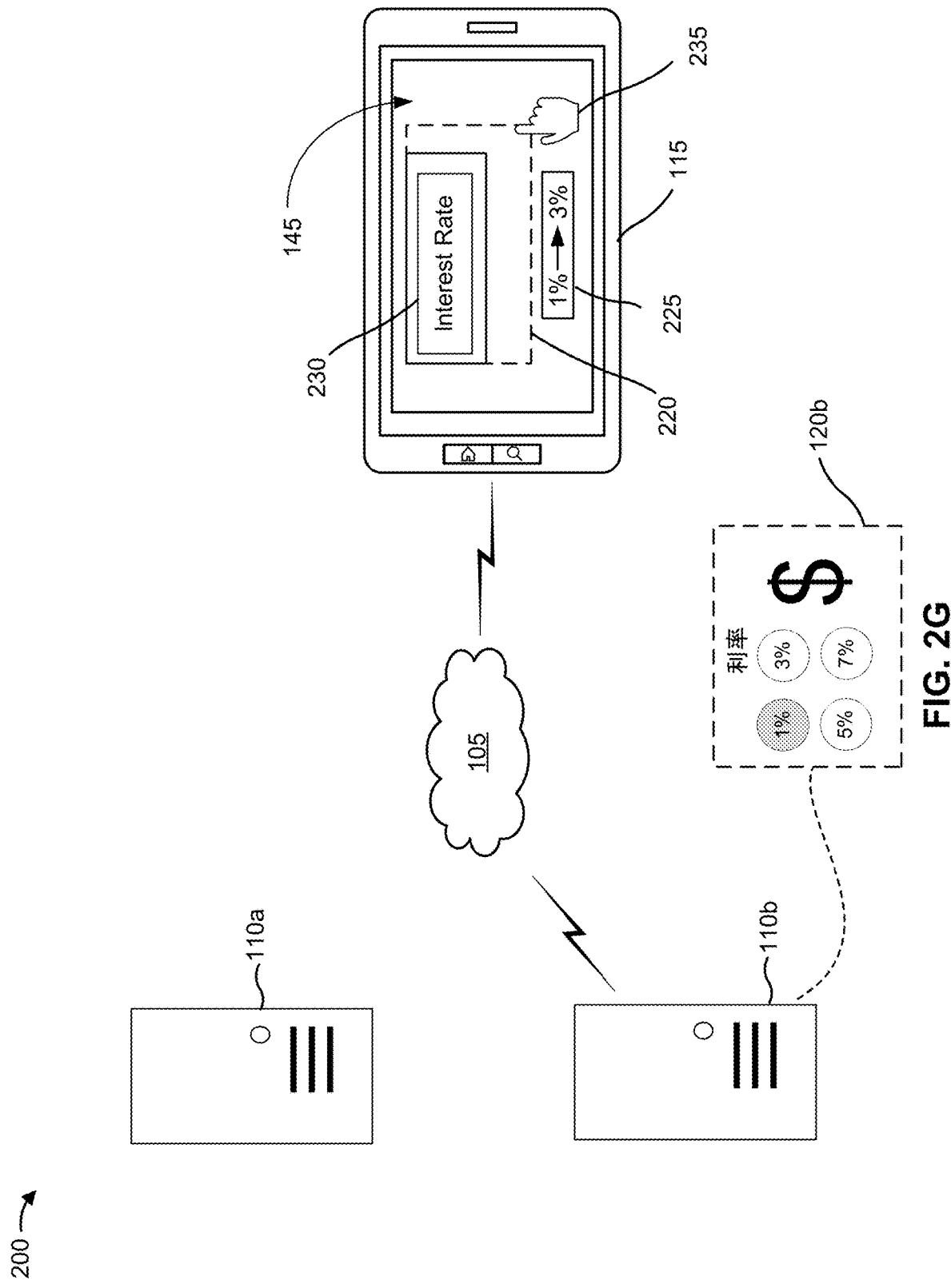

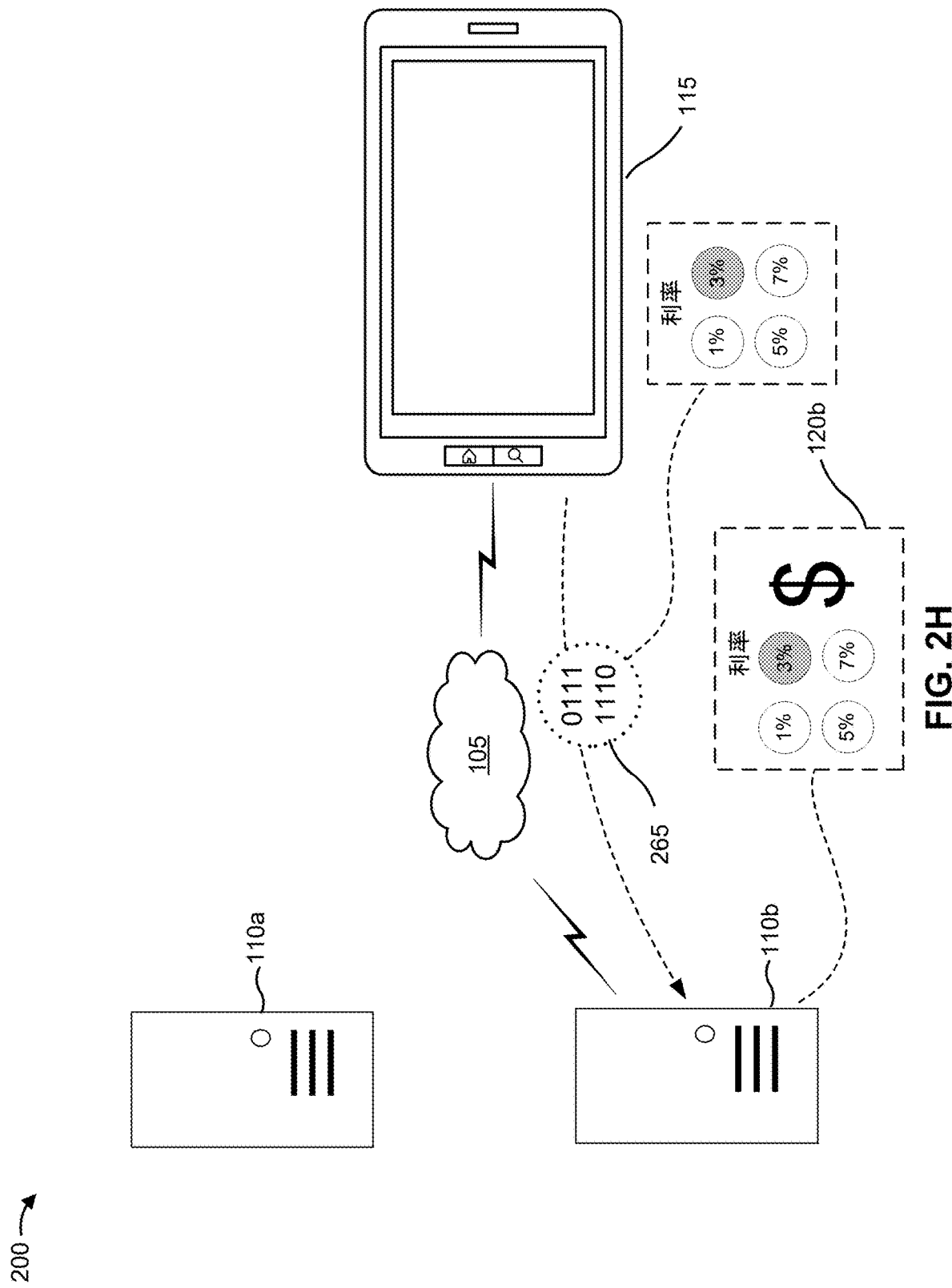

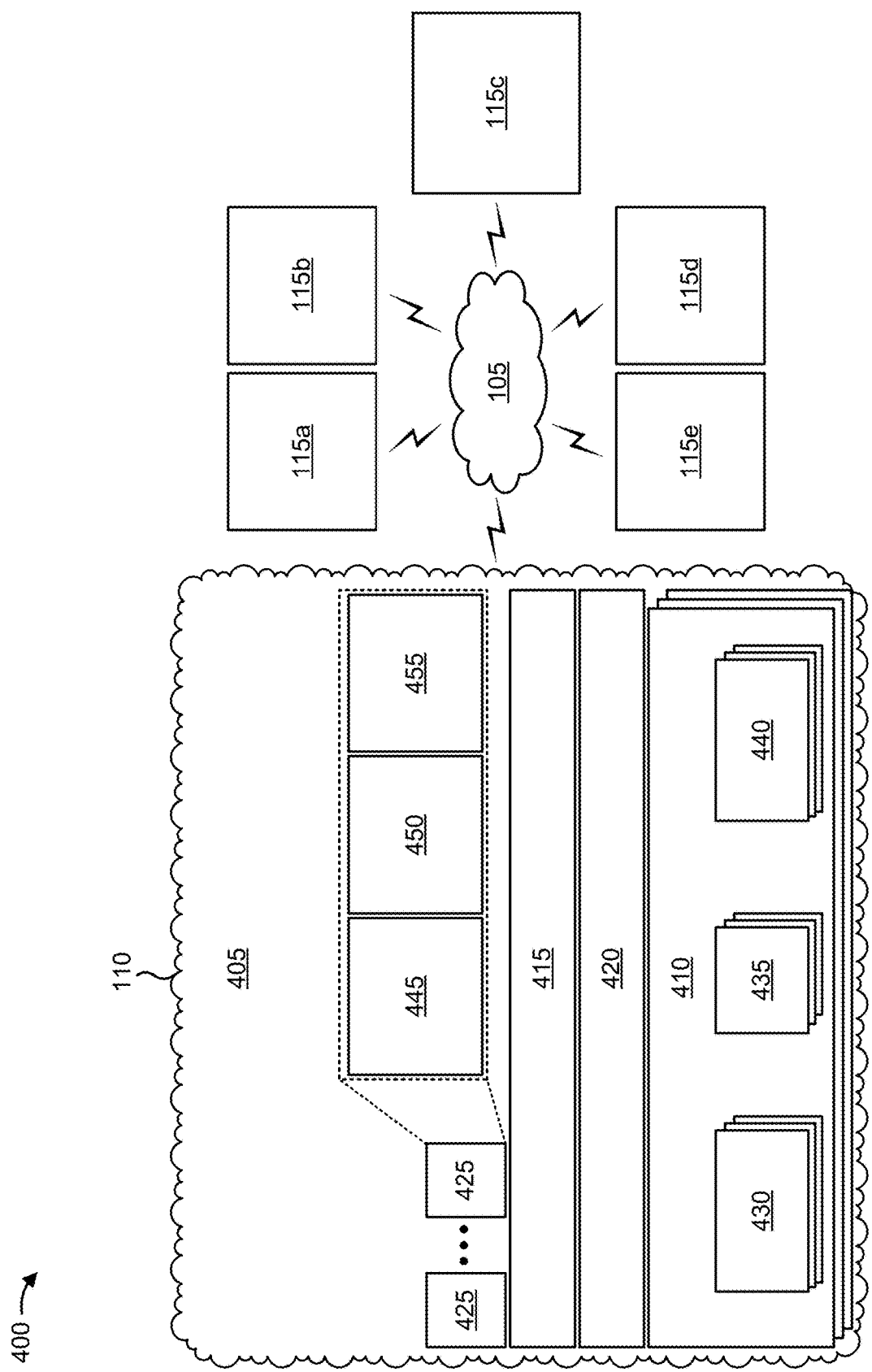

SOFTWARE PARAMETER MANAGEMENT THROUGH A UNIVERSAL INTERFACE

BACKGROUND

A software application often incudes one or more parameters that may be changeable by a user of the software application. Examples include a financial modeling software which may include a changeable financial metric, a product pricing software which may include a changeable product price, and a hardware design software that may include a changeable voltage and/or electrical current. Such parameters may be changed through a graphical user interface (GUI) of a user device.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A-2H are diagrams of an example implementation of software parameter management through a universal interface described herein.

FIG. 4 is a diagram of an example environment in which systems and/or methods described herein may be implemented.

DETAILED DESCRIPTION

Figure 1:
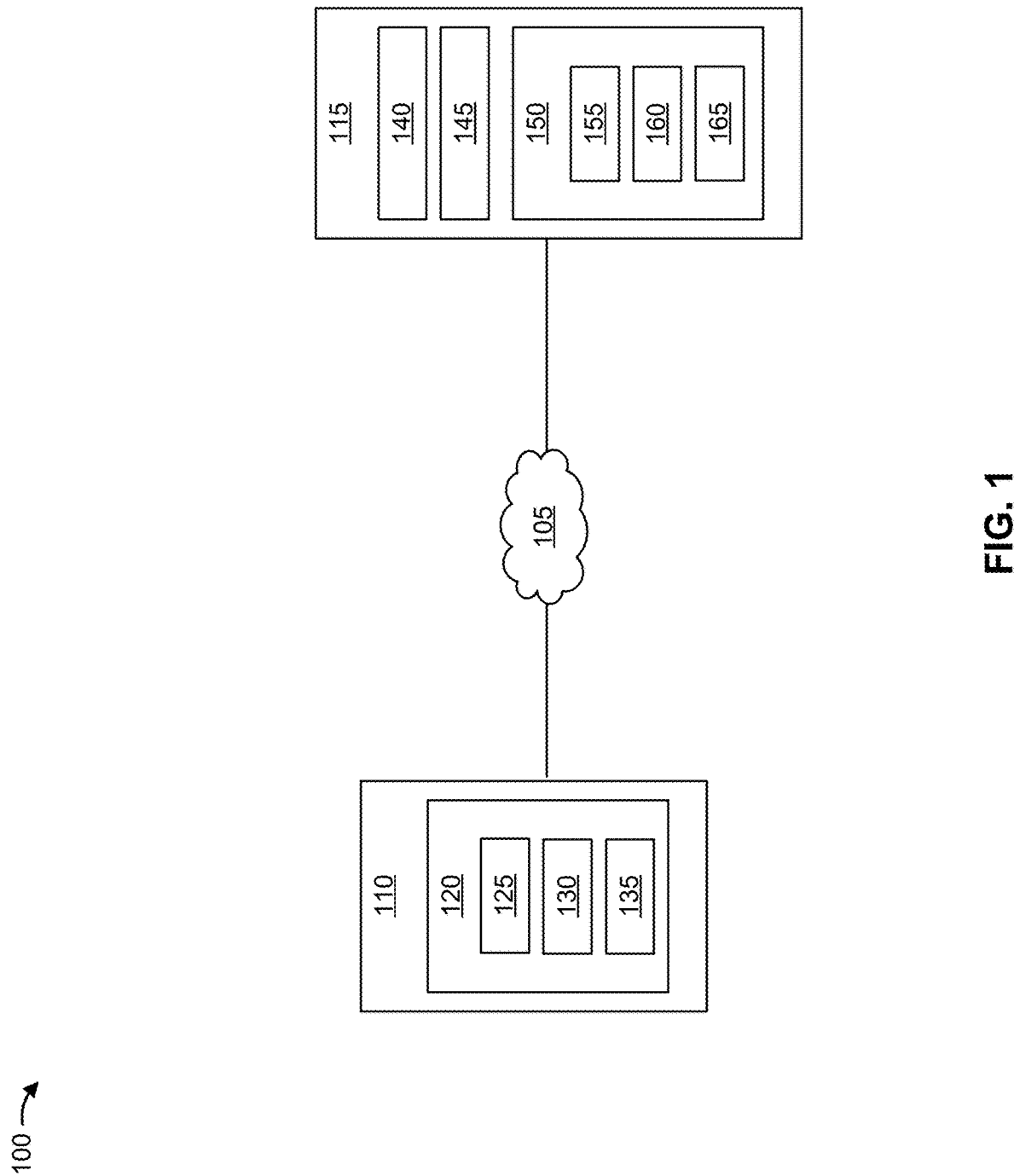
FIG. 1 is a diagram of example devices for software parameter management through a universal interface described herein.

The following disclosure provides many different implementations, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include implementations in which the first and second features are formed in direct contact, and may also include implementations in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various implementations and/or configurations discussed.

In some cases, a user may interact with multiple software applications having different sets of changeable parameters. The different sets of changeable parameters may be provided to the user through a graphical user interface of a user device. Each set, however, may be provided through the graphical user interface using a different format. Additionally, an input by the user to change values associated with each set of changeable parameters may vary (an input may be received by the user device through a keyboard, through a mouse-click, or through a touch action to the graphical user interface, among other examples).

Further, and in some cases, the multiple software applications may each be hosted remotely on different computing systems. In such cases, the multiple software applications may, in native form, use different machine languages and be configured to textually describe the different sets of changeable parameters using different language scripts.

The combination of different formats, different inputs, different machine languages, and different language scripts across the multiple software applications may make it difficult for the user to efficiently manage the different sets of changeable parameters across the multiple software applications. As an example, the user may not have an input device (e.g., a keyboard or a mouse) needed to change a parameter associated with a particular software application. Additionally, or alternatively, the user may pause while navigating a format with which the user is unfamiliar. Additionally, or alternatively, the user may pause while trying to interpret a description of a parameter that is provided in a language script with which the user is not familiar. Such examples may lead to excessive idle time of either the user device and/or host computing systems that host the multiple software applications. Further, and in the context of such examples, a user may be unable to adjust, or erroneously adjust, one or more values of the parameters across the multiple software applications.

Some implementations described herein provide techniques and apparatuses for software parameter management through a universal interface. The techniques and apparatuses include a user device including a universal parameter management application. The user device may receive multiple sets of changeable parameters that may be provided to the user device using different formats, different machine languages, and/or different language scripts. The universal parameter management application may translate the multiple sets of changeable parameters into a common format, common machine language, and/or common language script. The user device may then provide each of the multiple sets through a common, changeable graphical representation of the changeable parameters on a graphical user interface of the device. The user may change each of the multiple sets of changeable parameters through an input that changes the changeable graphical representation.

In this way, idle time of the user device and/or host computing systems hosting the multiple software applications may be reduced relative to techniques and apparatuses that accommodate changes to the multiple sets of parameters using different formats, different machine languages, and/or different language scripts. Additionally, an accuracy of changes to the multiple sets of changeable parameters may increase to reduce a need for re-entering changes to the multiple sets of changeable parameters and/or re-running the multiple software applications. As a result, an overall computing efficiency of the user device and/or the remote computing systems may increase.

FIG. 1 is a diagram 100 of example devices for software parameter management through a universal interface described herein. The example devices in FIG. 1 include a network 105. The diagram 100 includes a network 105, an application server 110, and a user device 115. The application server 110 and the user device 115 may be interconnected via the network 105.

The network 105 may include one or more wired and/or wireless networks. For example, the network 105 may include a wireless wide area network (e.g., a cellular network or a public land mobile network), a local area network (e.g., a wired local area network or a wireless local area network (WLAN), such as a Wi-Fit™ network), a personal area network (e.g., a Bluetooth® network), a near-field communication network, a telephone network, a private network, the Internet, and/or a combination of these or other types of networks. The network 105 enables communication among the devices of FIG. 1.

The application server 110 may include one or more devices capable of receiving, generating, storing, processing, providing, and/or routing information associated with software parameter management through a universal interface, as described elsewhere herein. The application server 110 may include a communication device and/or a computing device. For example, the application server 110 may include a server, such as an application server, a client server, a web server, a database server, a host server, a proxy server, a virtual server (e.g., executing on computing hardware), or a server in a cloud computing system. In some implementations, the application server 110 may include computing hardware used in a cloud computing environment.

The user device 115 may include one or more devices capable of receiving, generating, storing, processing, and/or providing information associated with software parameter management through a universal interface, as described elsewhere herein. The user device 115 may include a communication device and/or a computing device. For example, the user device 115 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

As shown in FIG. 1, the application server 110 may include application software 120. The application software 120 may be in a compiled, partially compiled, or uncompiled state (and compiled after operation of implementations disclosed here). Furthermore, the application software 120 may be written in, or compatible with, a particular machine language (e.g., a code such as Python, C++, Java). Examples of the application software 120 may be financial modeling software, a machine learning pipeline, semiconductor device modeling software, other artificial intelligence software, hardware design software, software design software, a computer game, graphical software, or a product pricing software. The application software 120 may be any type of application software which accepts one or more changeable and defined parameters as further discussed herein.

Application software 120 may utilize one or more parameters (e.g., values), objects, and/or other computer data structure which are referenced and relied upon by the application software 120 in executing various functionality. In the example where application software 120 is a product pricing software such as an airline pricing software, the one or more parameters may include a number of seats on a plane, a price for each seat, a price of jet fuel, and/or a landing fee for an airport, among other examples. In the example where application software 120 is a machine learning pipeline, the one or more parameters may include a cost of training each pipeline, values of training data, feature selection parameters, hyperparameter optimization parameters, and/or a machine learning model being utilized, among other examples. In the example where the application software 120 is a semiconductor device modeling software, the one or more parameters may include a threshold voltage, a channel geometry, a doping concentration, and/or a gate oxide thickness, among other examples.

The application software 120 may accept changes to values of one or more parameters prior to the application server 110 compiling and executing the application software 120. In implementations when application software 120 is uncompiled or partially compiled, the one or more parameters are utilized to update values of variables, objects, other data structures, etc. when compiling a run-time version of application software 120. In implementations when application software 120 is previously compiled, the updated changeable parameters may be used during run-time to reflect updates to the values of these parameters.

As shown in FIG. 1, the application software 120 includes a parameter storage module 125, a software execution module 130, and an application software interface module 135. The parameter storage module 125 includes software, firmware, and/or hardware for storage of values of one or more parameters utilized as further discussed herein. The one or more parameters may be stored in one or more variables, objects, other data structures, registers, spreadsheets, etc. associated with parameter storage module 125.

The software execution module 130 includes software, firmware, and/or hardware for compiling and/or execution of updated versions of application software 120 after values of parameters have been stored within the parameter storage module 125.

The application software interface module 135 includes software, firmware, and/or hardware for interfacing the application software 120 with a device external to the application server 110. In some implementations, the application software interface module 135 transmits and/or receives a parameter and descriptive textual information to the device. In some implementations, the application software interface module 135 transmits and/or receives the parameter and descriptive textual information using a particular machine code and/or a particular language script. In some implementations, the application software interface module 135 transmits a notification indicating a status of the parameter (a notification indicating that the parameter does not satisfy a threshold or a notification that the parameter has been successfully updated, among other examples). Further, the application software interface module 135 may, in conjunction with the software execution module 130, operate to generate notifications of updates made to the application software 120, new versions of compiled software, updating of runtime versions of the application software 120, and/or the like. Notifications from the application software interface module 135 may be transmitted in the form of a push notification, get notification, or status update according to a schedule.

As shown in FIG. 1, the user device 115 may include a processor 140, a graphical user interface 145, and a universal parameter management application 150. In some implementations, one or more portion of the universal parameter management application 150 are stored in a non-transitory computer-readable medium (e.g., one or more memories). As described in greater detail in connection with FIGS. 2A-7, and elsewhere herein, the processor 140 may execute one or more portions of the universal parameter management application 150 related to managing software parameters through the graphical user interface 145. In some implementations, one or more portions of the universal parameter management application 150 are stored in a non-transitory computer-readable medium. In some implementations, such operations manage one or more parameters of to the application software 120 included in the application server 110.

The universal parameter management application 150 may access the application software 120 across the network 105 and, while accessing the application software 120, access one or more values of user-defined parameters associated with the application software 120. In some implementations, and after universal parameter management application 150 accesses the application software 120, the universal parameter management application 150 generates and displays one or more visual representations of the one or more parameters, such as with a graphical user interface, chart, or other computer graphic reflecting the current values of each parameter. The universal parameter management application 150 may accept modifications from the user to the parameters by allowing the user to manipulate the one or more visual representations of the parameters. Manipulations may be made, for example, by a user clicking on a certain area of the graphical user interface 145 (that area signifying a certain parameter for altering a value of), and the user then shrinking or expanding portions of the graphical user interface such as by a user "pinching in" or "pinching out" portions of the graphical user interface, using a "one stroke" manipulation, etc. The universal parameter management application 150 then, after calculating a significance of these manipulations, transmits requested user modifications to parameters to the application software 120, and dynamically updates the visual representation, based on the requested modifications.

The universal parameter management application 150 includes one or more of an application software access module 155, a parameter visual representation module 160, and a graphical user interface tracking module 165.

The application software access module 155 includes software, firmware, and/or hardware for accessing and communicating with application software 120. In some implementations, the application software access module 155 accesses the application software 120 based upon a schedule, upon request from a user, continuously, and/or the like. When application software access module 155 accesses the application software 120, values of changeable parameters as stored by application software 120 are provided to application software access module 155. After updates are made to changeable parameters, the application software access module 155 transmits to the application software 120 updated values of the changeable parameters (e.g., for use in connection with the application software 120).

The parameter visual representation module 160 includes software, firmware, and/or hardware for generating one or more visual representations of one or more current values of the changeable parameters. The one or more visual representations are displayed in a graphical user interface allowing direct manipulation by a user (or, in alternative implementations, displayed in spreadsheet(s), table(s), radio button(s), computer graphic(s), or other visualization(s) generated by the parameter visual representation module 160). Manipulations by the user to the one or more visual representations signify changes made to the parameters, and are interpreted by the graphical user interface tracking module 165. The application software access module 155 may transmit requested changes made to the parameters to the application software 120 for updates or modifications to application software 120. After manipulation by the user modifying the one or more visual representations (the manipulations tracked by graphical user interface tracking module 165), the parameter visual representation module 160 may dynamically modify displayed visual representation(s) of the one or more changeable parameters based upon the manipulation (such as by changing a color, size, orientation, direction, moving, etc. of the visual representations in response to receiving the manipulation). In various implementations of the invention, the visual representations may include labeled shapes, graphs, tables, and/or other visual representation, with the label signifying which parameter may be edited by manipulations from the user (as well as a current value of the parameter).

Graphical user interface tracking module 165 includes software, firmware, and/or hardware for tracking manipulations from the user of one or more visual representations. Manipulations from the user are provided, in various implementations, from any sort of pointing device manipulated by the user. As discussed previously, parameter visual representation module 160 displays one or more visual representations of one or more current values of the changeable parameters in a format visible to the user. As users manipulate the one or more visual representations of the one or more current values, graphical user interface tracking module 165 tracks these manipulations, and interprets their significance. For example, the manipulations may be in the form of a user enlarging or shrinking a visual representation. The graphical user interface tracking module 165 interprets the enlarging or shrinking as increasing or decreasing a value of an associated parameter (such as by "pinching-in" or "pinching-out," other touchscreen manipulations like a "1-stroke method", clicking and dragging, etc.). In some implementations, manipulations to visual representations are received via a pointing device, such as a mouse, light pen, touchscreen, head-worn sensor, smart glasses, etc. Manipulations made to the visual representation(s) proportionally change values of the one or more changeable parameters according to the percent changes to sizes, orientations, locations, etc. of the visual representations. After all manipulations to the visual representation(s) of current values are received, updated values of the one or more current values are sent back to application software 120 by application software access module 155, for utilization in updating of application software 120.

As described in greater detail in FIGS. 2A-7 and elsewhere herein, a device (e.g., the user device 115) includes one or more memories. The device includes one or more processors (e.g., the processor 140), coupled to the one or more memories, configured to, receive, from an application (e.g., the application software 120), a set of changeable parameters and provide, through a graphical user interface (e.g., the graphical user interface 145), the set of changeable parameters in a format that includes a changeable graphical representation. In some implementations, a first value of the set of changeable parameters corresponds to a first attribute of the changeable graphical representation. In some implementations, a second value of the set of changeable parameters corresponds to a second attribute of the changeable graphical representation. The one or more processors are further configured to provide, through the graphical user interface, a change to the changeable graphical representation that changes the first value of the set of changeable parameters to a third value and that changes the second value of the set of changeable parameters to a fourth value and to transmit, to the application, the third value and the fourth value.

Additionally, or alternatively and as described in greater detail in connection with FIGS. 2A-7 and elsewhere herein, some implementations described herein provide a non-transitory computer-readable medium that stores a set of instructions (e.g., the universal parameter management application 150). The set of instructions includes one or more instructions (e.g., the application software access module 155, the parameter visual representation module 160, and the graphical user interface tracking module 165) that, when executed by one or more processors of a device (e.g., the processor 140 of the user device 115), cause the device to receive, from a first application (e.g., a first implementation of the application 120) a first value in a first machine language, convert the first value in the first machine language to a format, and provide, for display through a graphical user interface (e.g., the graphical user interface 145), the first value using the format. In some implementations, the one or more instructions, that cause the device to provide the first value using the format, cause the device to provide a changeable graphical representation of the first value and a changeable textual representation of the first value through the graphical user interface. The one or more instructions, when executed by the one or more processors, further cause the device to receive, through the graphical user interface, a change of the first value to a second value. In some implementations, the change of the first value to the second value is based on receiving a change to the changeable graphical representation of the first value. The one or more instructions, when executed by the one or more processors, further cause the device to transmit, to the first application, the second value in the first machine language and receive, from a second application (e.g., a second implementation of the application 120), a third value in a second machine language. The one or more instructions, when executed by the one or more processors, further cause the device to convert the third value in the second machine language to the format and provide, through the graphical user interface, the third value using the format. In some implementations, the one or more instructions, that cause the device to provide the third value using the format, cause the device to provide a changeable graphical representation of the third value and a changeable textual representation of the third value. The one or more instructions, when executed by the one or more processors, further cause the device to receive, through the graphical user interface, a change of the third value to a fourth value. In some implementations, the change of the third value to the fourth value is based on receiving a change to the changeable graphical representation of the third value. The one or more instructions, when executed by the one or more processors, further cause the device to transmit, to the second application, the fourth value in the second machine language As indicated above, FIG. 1 is provided as an example. Other examples may differ from what is described with regard to FIG. 1.

FIGS. 2A-2H are diagrams of an example implementation 200 of software parameter management through a universal interface described herein. The example implementation 200 includes the application server 110a, the application server 110b, and the user device 115.

Figure 2A:
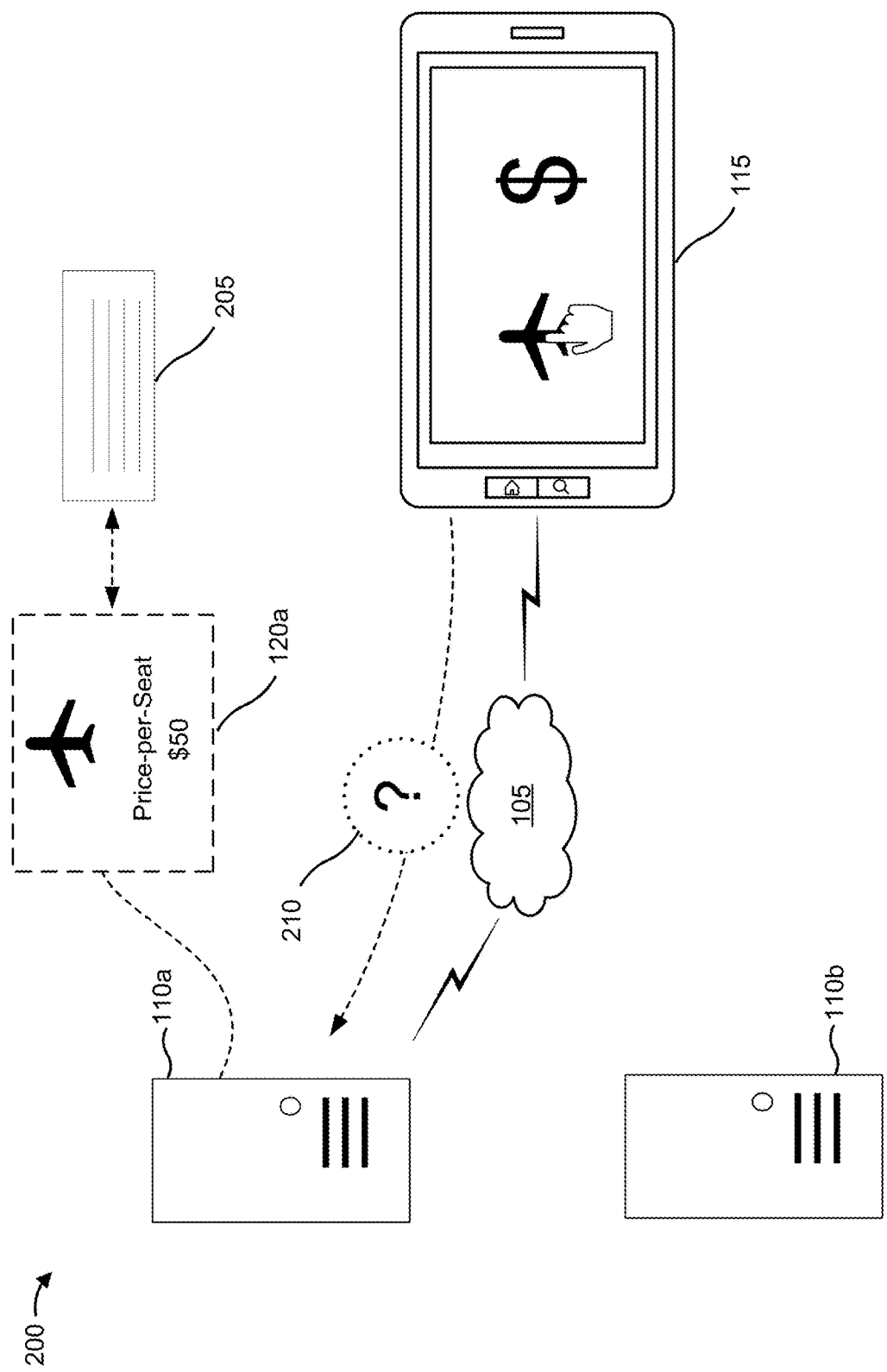

As shown in FIG. 2A, the application server 110a is hosting a product pricing application software 120a (e.g., an airline seat pricing application). As further shown in FIG. 2A, the product pricing application software 120a is configured to receive changes to a set of changeable parameters (e.g., including a price-per-seat value) through inputs to a keyboard 205. In FIG. 2A, the user device 115, using the application software access module 155, transmits a request 210 for the changeable parameter to the application server 110a via the network 105.

Figure 2B:
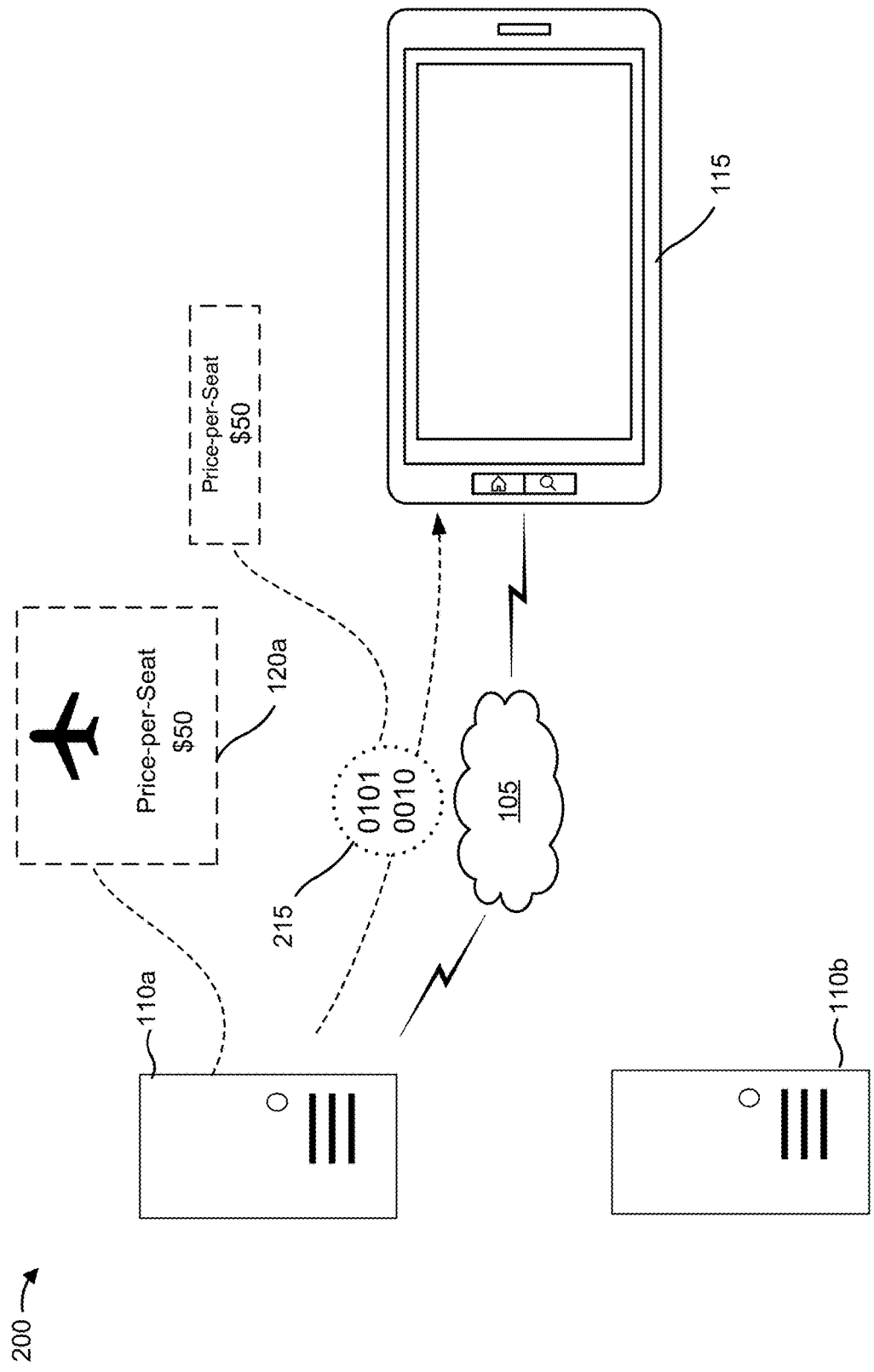

As shown in FIG. 2B the application server 110a, using the application software interface module 135 may transmit the changeable parameter (e.g., including a current or beginning value of $50) to the user device via the network 105. In some implementations, the changeable parameter is transmitted via a data packet 215 including a format (e.g., the configuration to receive changes to the parameter through the keyboard 205), a machine language, and/or a language script corresponding to a textual description of the parameter. The format, machine language, and language script may be native to the product pricing application software 120a on the application server 110a.

Figure 2C:
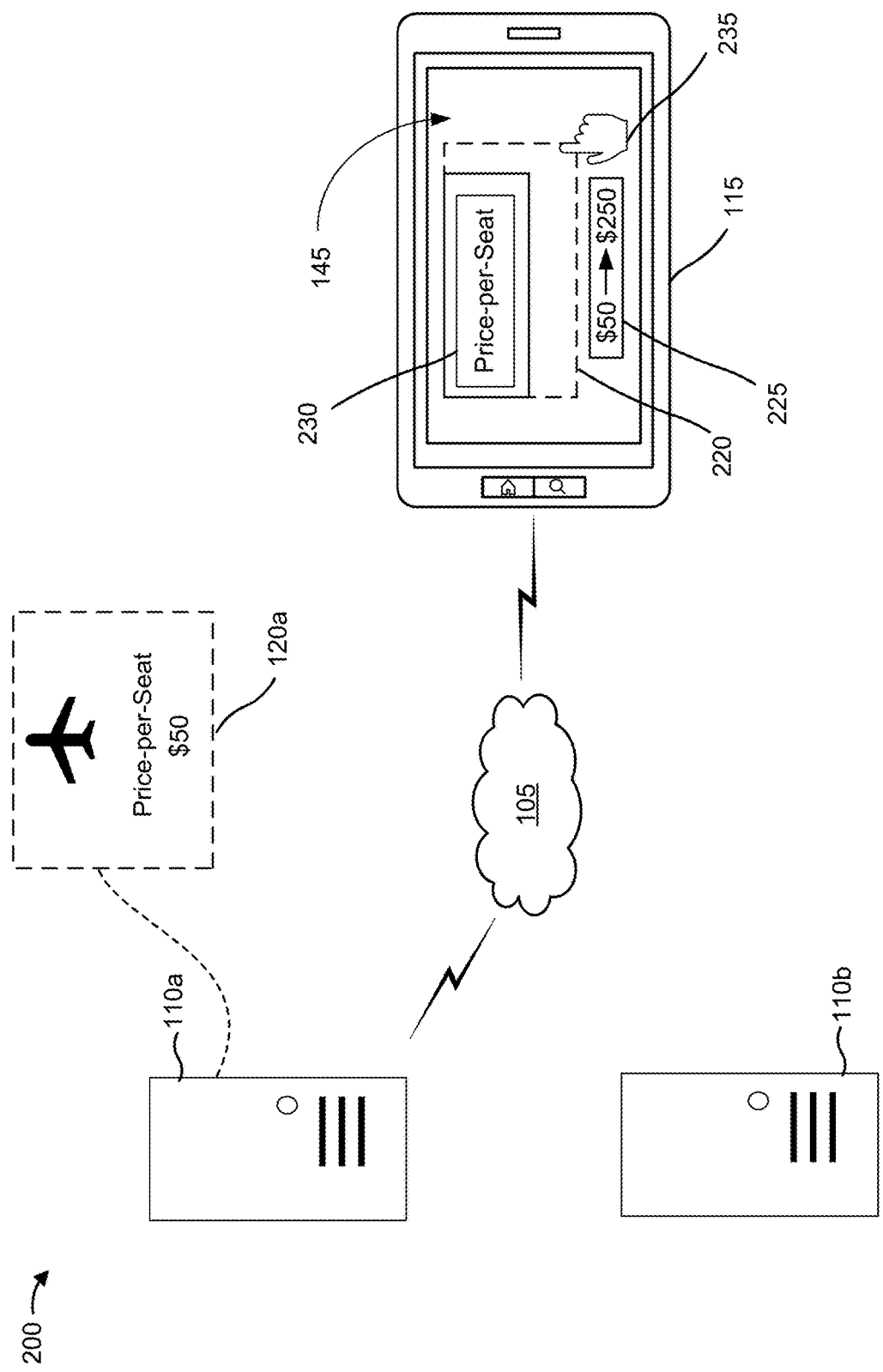

As shown in FIG. 2C the user device 115, using the application software access module 155, may convert the changeable parameter to be useable by a user of the user device 115. For example, the application software access module 155 may receive and translate the data packet 215 to another machine language that is compatible with the parameter visual representation module 160 and/or the graphical user interface tracking module 165. Additionally, or alternatively, the parameter visual representation module 160 and/or the graphical user interface tracking module 165 may change a format of the changeable parameter (e.g., the format configured to receive changes to the parameter through the keyboard 205) to a standardized format configured to receive a scalable touchscreen input (e.g., a scalable geometric shape, a scalable slide bar, or a scalable color, among other examples).

As further shown in FIG. 2C the user device 115, using the parameter visual representation module 160 and/or the graphical user interface tracking module 165, provides the changeable parameter to the graphical user interface 145 using the standardized format. As an example, and as shown in FIG. 2C, the standardized format of the changeable parameter includes a changeable graphical representation 220 of a value (e.g., a scalable rectangle), a changeable textual representation 225 of the value, and a textual description 230 (e.g., a textual description in a language script with which the user is familiar). In some implementations, a magnitude of the value may correspond to an area or size of the changeable graphical representation 220 (e.g., the scalable rectangle).

As shown in FIG. 2C, the user provides an input 235 (e.g., a drag input) to the graphical user interface 145. The input 235, as shown, changes the scalable changeable graphical representation of the parameter to an updated value. In some implementations, and as shown in FIG. 2C, the changeable textual representation 225 of the value may show a "from" value (e.g., a received starting price of $50) and a "to" value (e.g., an updated price of $250). The user may confirm the updated value through one or more operations (the user may pause the drag input for a set duration of time or tap the graphical user interface 145, among other examples).

Figure 2D:
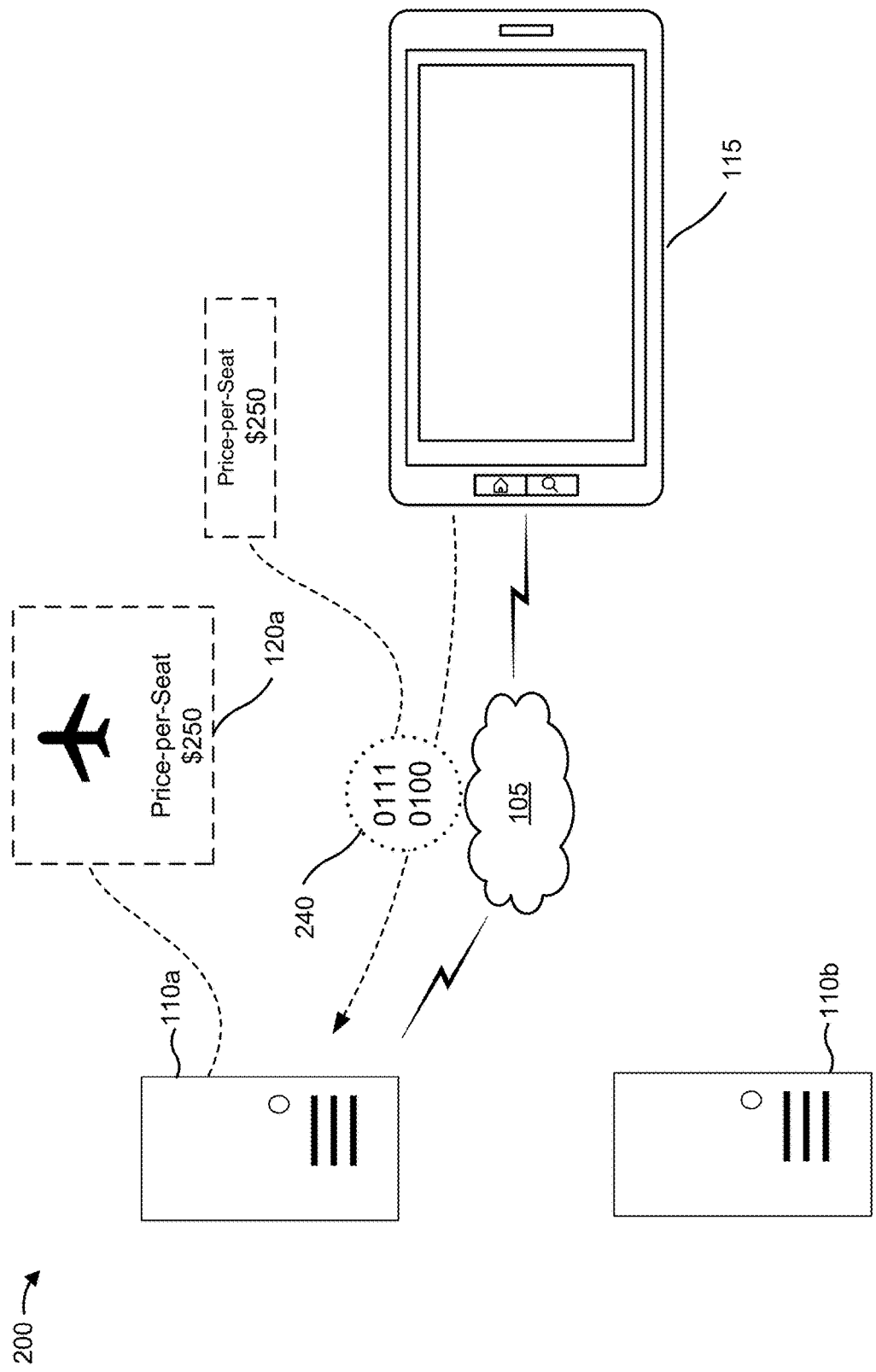

As shown in FIG. 2D the user device 115, using the application software access module 155, may provide the changeable parameter including the updated value (e.g., the updated price of $250) to the application server 110a (e.g., provide the updated value to the parameter storage module 125 of the product pricing application software 120a). Providing the changeable parameter including the updated value may include the user device 115 generating and transmitting a data packet 240 that is compatible with the format, machine language, and/or language script native to the product pricing application software 120a on the application server 110a.

As shown in FIG. 2E, the application server 110b is hosting a financial modeling application software 120b (e.g., an interest rate modeling application). As further shown in FIG. 2E, the financial modeling application software 120b is configured to receive changes to a changeable parameter (e.g., an interest rate) through selection by a mouse 245. In FIG. 2E, the user device 115, using the application software access module 155, transmits a request 250 for the changeable parameter to the application server 110b via the network 105.

As shown in FIG. 2F the application server 110b, using the application software interface module 135 may transmit, the changeable parameter (e.g., including a current or beginning value of 1%) to the user device via the network 105. In some implementations, the changeable parameter is transmitted via a data packet 255 including a format (e.g., the configuration to receive changes to the parameter through the mouse 245), a machine language, and/or a language script corresponding to a textual description of the parameter. The format, machine language, and language script may be native to the financial modeling application software 120b on the application server 110b.

As shown in FIG. 2G the user device 115, using the application software access module 155, may convert the changeable parameter to be useable by a user of the user device 115. For example, the application software access module 155 may receive and translate the data packet 255 to the machine language that is compatible with the parameter visual representation module 160 and/or the graphical user interface tracking module 165. Additionally, or alternatively, the parameter visual representation module 160 and/or the graphical user interface tracking module 165 may change a format of the changeable parameter (e.g., the format configured to receive a selection of the parameter through the mouse 245) to a standardized format configured to receive a scalable touchscreen input (e.g., a scalable geometric shape, a scalable slide bar, or a scalable color, among other examples).

As further shown in FIG. 2G the user device 115, using the parameter visual representation module 160 and/or the graphical user interface tracking module 165, provides the changeable parameter to the graphical user interface 145 using the standardized format (e.g., the same standardized format as described in connection with FIG. 2C). As an example, and as shown in FIG. 2G, the standardized format of the changeable parameter includes the changeable graphical representation 220 of a value (e.g., a scalable rectangle) and the changeable textual representation 225 of the value. Further, the textual description 230 in the standardized format includes the textual description in the language script with which the user is familiar (e.g., the textual description has been converted from a Kanji script to an English script).

As shown in FIG. 2G, the user provides an input 235 (e.g., a drag input) to the graphical user interface 145. The input 235, as shown, changes the scalable changeable graphical representation of the parameter to an updated value. In some implementations, and as shown in FIG. 2G, the changeable textual representation 225 of the value may show a "from" value (e.g., a received starting interest rate of 1%) and a "to" value (e.g., an updated interest rate of 3%). The user may confirm the updated value through one or more operations (the user may pause the drag input for a set duration of time or tap the graphical user interface 145, among other examples).

As shown in FIG. 2H, the user device 115, using the application software access module 155, may provide the changeable parameter including the updated value (e.g., the updated interest rate of 3%) to the application server 110a (e.g., provide the updated value to the parameter storage module 125 of the product pricing application software 120a). Providing the changeable parameter including the updated value may include the user device 115 generating and transmitting a data packet 265 that is compatible with the format, machine language, and/or language script native to the financial modeling application software 120b on the application server 110b.

As indicated above, FIGS. 2A-2H are provided as an example. Other examples may differ from what is described with regard to FIGS. 2A-2H.

Figure 3A:
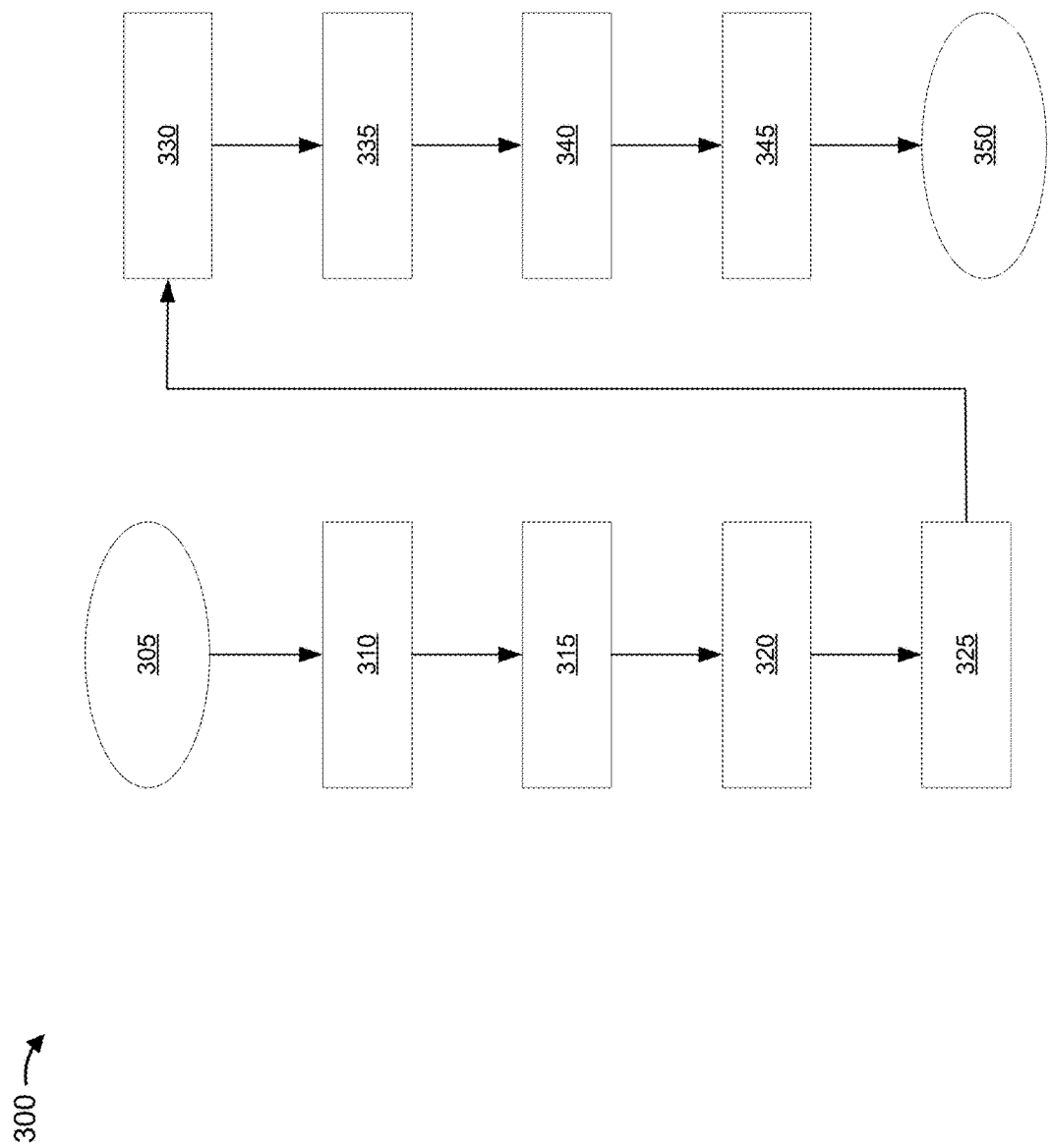
FIGS. 3A-3C are diagrams associated with an example implementation of a universal parameter management application providing a universal interface through a graphical user interface described herein.
Figure 3B:
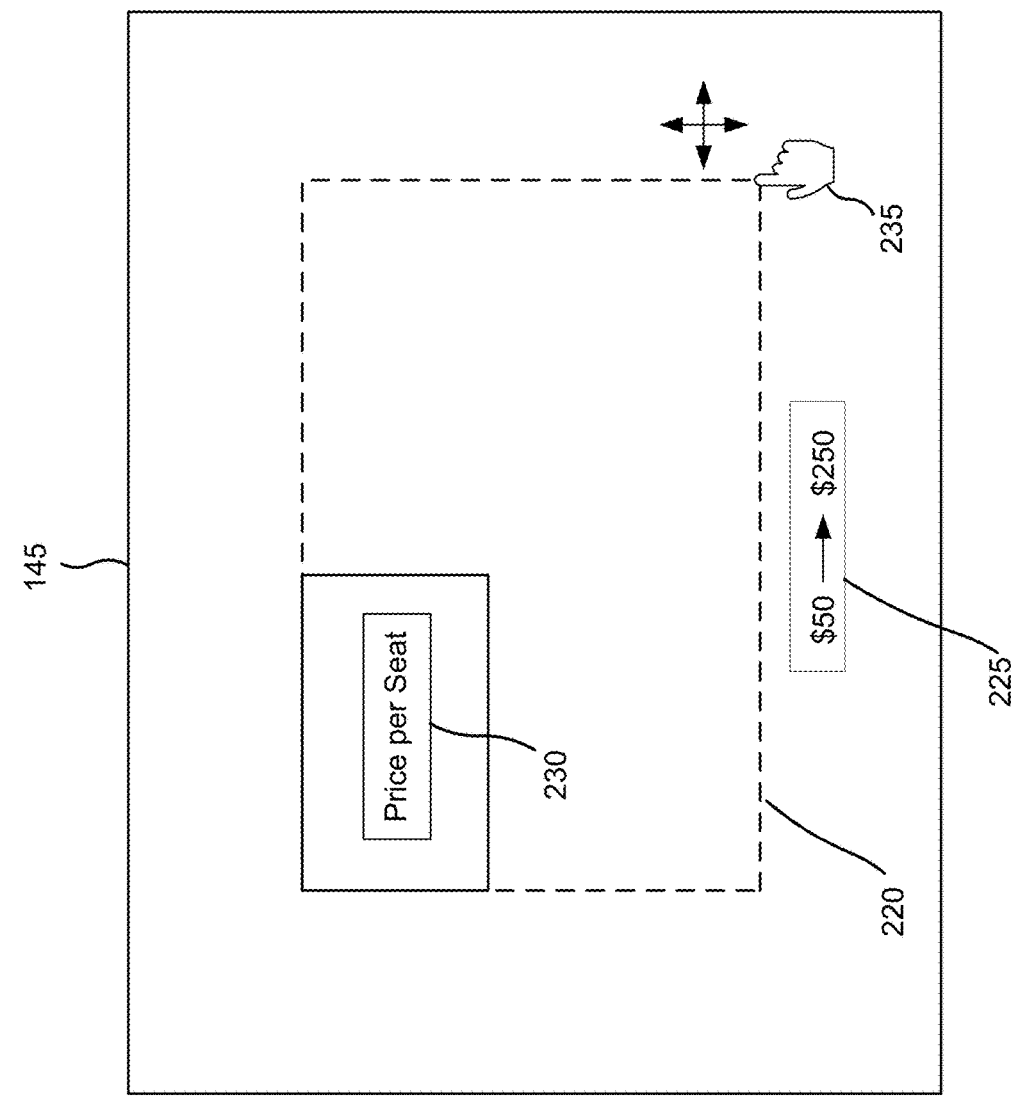
Figure 3C:
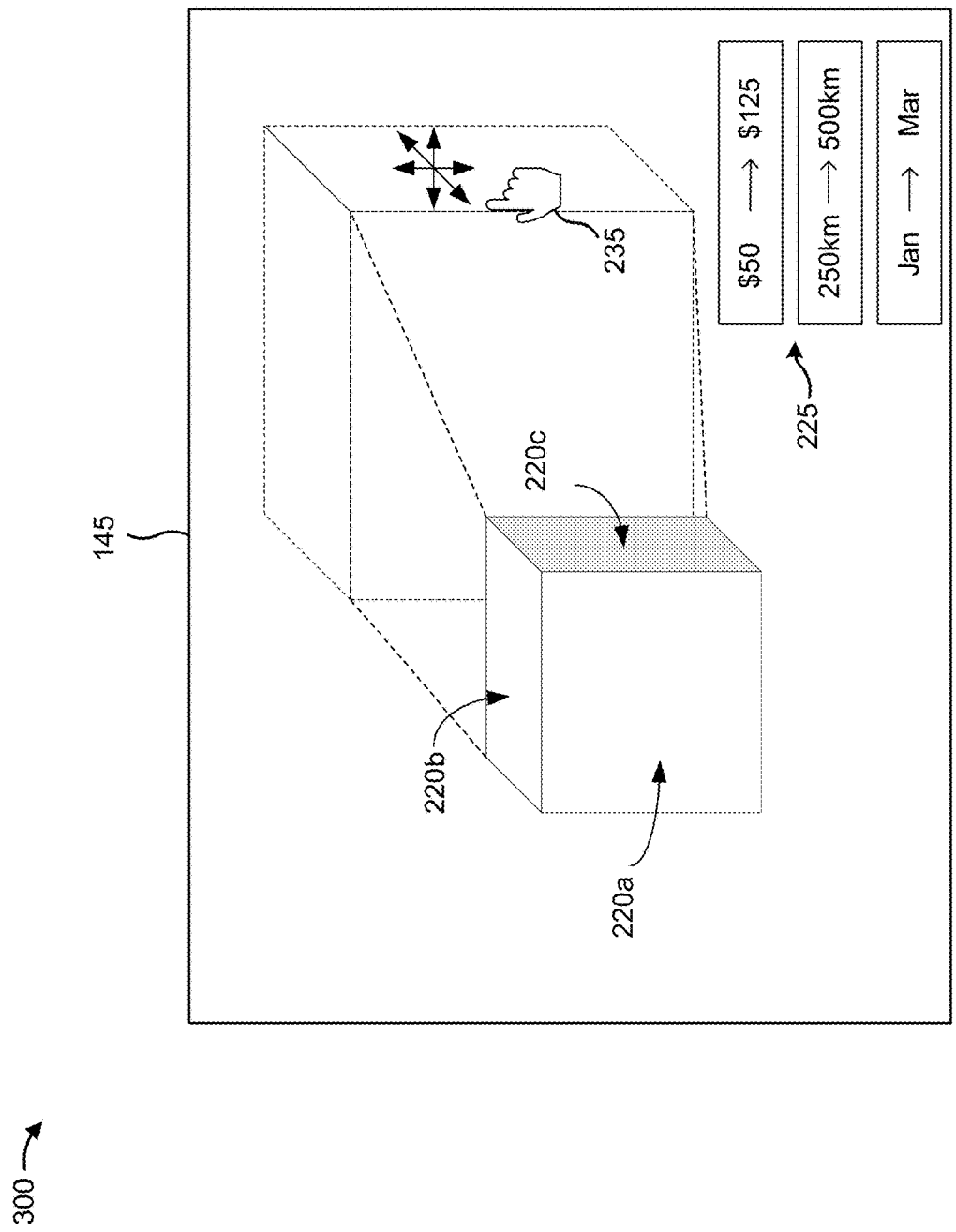

FIGS. 3A-3C are diagrams associated with an example implementation 300 of the universal parameter management application 150 providing a universal interface through the graphical user interface 145 described herein. The example implementation includes one or more operations performed by the universal parameter management application, including the application software access module 155, the parameter visual representation module 160, and the graphical user interface tracking module 165.

As shown in FIG. 3A, the series of operations begins with starting operation 305. At operation 310, the application software access module 155 may access the application software 120 storing the one or more changeable parameters. At operation 315, application software access module 155 accesses current values of the one or more changeable parameters from application software 120 (current values of the changeable parameters stored by the parameter storage module 125). Accessing the current values of the one or more changeable parameters may include transmitting a request and receiving the current values of the one or more changeable parameters.

At operation 320, the parameter visual representation module 160 may generate one or more changeable graphical representations of the one or more current values of the changeable parameters. At operation 325, the parameter visual representation module 160 may provide, for display, the generated one or more changeable graphical representations of the current values of the changeable parameters using the graphical user interface 145. At operation 330, the graphical user interface tracking module 165 may receive a manipulation from the user modifying the one or more graphical representations via the graphical user interface 145. The manipulation may be interpreted by the graphical user interface tracking module 165 to update the current values of the changeable parameters with new values. A graphical representation may, for example, be enlarged to increase a value corresponding to a changeable parameter, or may, for example, be reduced to decrease a value corresponding to the changeable parameter.

At operation 335, the parameter visual representation module 160 may modify, dynamically, the changeable graphical representations of the one or more changeable parameters based upon the received manipulation from the user. At operation 340, the application software access module 155 of the universal parameter management application 150 may transmit, to the application software 120, the new values of the changeable parameters for updating of the application software 120. At operation 345, the application software access module 155 may receive notification of a completed update to the application software 120 based upon the new values of the changeable parameters. The series of operations ends with ending operation 350.

FIG. 3B shows details of an example graphical representation of a changeable parameter that may be presented through the graphical user interface 145 as part of the implementation 300. As is shown in FIG. 3B, within the graphical user interface 145, a changeable graphical representation 220, corresponding to a changeable parameter "price-per-seat," may be provided for display, along with a current value of the changeable parameter. With an input 235 (e.g., a cursor displaying actions the user is taking through the graphical user interface 145), the user may manipulate the changeable graphical representation 220 to an un-confirmed larger size (indicated with dotted lines). As shown in FIG. 3B, the changeable textual representation 225 indicates that the changeable graphical representation 220 corresponds to the "price-per-seat" changing from $50 to $250.

In some implementations, a scaling-up (or scaling-down) of the changeable parameter is bound by an upper-threshold and/or a lower-threshold received by the user device 115 (e.g., received as part of the data packet 215 of FIG. 2B). In such cases, and if the upper-threshold or lower-threshold are satisfied during the manipulation of the changeable graphical representation 220, an area within the changeable graphical representation (e.g., within the dotted lines) may include a color (e.g., green). Conversely, and in such cases, if the upper-threshold or the lower-threshold are not satisfied during the manipulation of the changeable graphical representation 220, the changeable graphical representation 220 may include another color (e.g., red).

In some implementations, if scaling actions taken by the user cause the changeable graphical representation to exceed a visible area of graphical user interface 145, the changeable graphical representation 220 may be divided into multiple changeable graphical representations. In the case where changeable graphical representation 220 is split into multiple changeable graphical representations, the multiple changeable graphical representations may be adjusted simultaneously based on manipulation from the user.

FIG. 3C shows details of an example graphical representation of a set of changeable parameters that may be presented through the graphical user interface 145 as part of the implementation 300. As is shown in FIG. 3C, a user device (e.g., user device 115) may provide for display, within the graphical user interface 145, a single changeable graphical representation that is associated with multiple changeable graphical representations 220*a*-220*c*. In the example shown in FIG. 3C, the single changeable graphical representation corresponds to a three-dimensional cube that is associated with three changeable graphical representations. In some implementations, the single changeable graphical representation may correspond to different geographical shapes having a greater or lesser quantity of changeable graphical representations. In some implementations, and as shown in FIG. 3C, the set of changeable parameters may be interrelated and presented as the three-dimensional cube. For example, the changeable graphical representation 220*a* may correspond to a price-per-seat parameter, the changeable graphical representation 220*b* may correspond to a distance parameter, and the changeable graphical representation 220*c* may correspond to a time period parameter.

In the example of FIG. 3C, the user may manipulate one or more axes of the three-dimensional cube through the graphical user interface 145. As the user manipulates the one or more axes, content displayed in the changeable textual representation 225 may change dynamically. Further, and in some implementations, an attribute of each of the changeable graphical representations 220*a*-220*c* (e.g., a length, a width, an area, or a color) may correspond to a value of a parameter.

In the example of FIG. 3C, the changeable graphical representations 220*a*-220*c* may be simultaneously manipulated, allowing for values for the corresponding parameters to be simultaneously changed. By allowing a user to manipulate multiple parameter values simultaneously, resources (e.g., processing resources, memory resources, network resources, among other examples) may be saved when compared to requiring the user to manipulate parameter values sequentially.

Using techniques described in connection with FIGS. 3A-3C (and in view of techniques described in connection with FIGS. 2A-2H), a device may perform a series of operations. The method includes receiving, by a device (e.g., the user device 115) and from a first application (e.g., the product pricing application software 120*a*), a first changeable parameter having a first value in a first format. The method includes translating, by the device, the first format into a second format, where the second format includes a changeable graphical representation (e.g., the changeable graphical representation 220) of the first value and a changeable textual representation (e.g., the changeable textual representation 225) of the first value. The method includes providing, by the device and for display through a graphical user interface (e.g., the graphical user interface 145), the first value in the second format. The method includes receiving, by the device and through the graphical user interface, a first input (e.g., the input 235) to the changeable graphical representation. The method includes converting, by the device and based on the first input, the first value to a second value, where the second value is different than the first value. The method includes providing, by the device and for display through the graphical user interface, the second value in the second format. The method includes transmitting, by the device and to the first application, the second value. The method includes receiving, by the device and from a second application (e.g., the financial modeling application software 120*b*), a second changeable parameter having a third value in a third format that is different than the first format. The method includes translating, by the device, the third format into the second format. The method includes providing, by the device and for display through the graphical user interface, the third value in the second format. The method includes receiving, by the device and through the graphical user interface, a second input to the changeable graphical representation that changes the third value to a fourth value. The method includes providing, by the device and for display through the graphical user interface, the fourth value in the second format. The method includes transmitting, by the device and to the second application, the fourth value.

Additionally, or alternatively, the series of operations includes receiving, by a device and from a first application (e.g., the product pricing application software 120*a*), a first value (e.g., a price-per-seat value) in a first machine language (e.g., Python). The series of operations includes converting, by the device, the first value in the first machine language to a format (e.g., a format configured to receive a change to the first value through the input 235 to the graphical user interface 145). The series of operations includes providing, by the device and for display through a graphical user interface 145, the first value using the format, where providing the first value using the format includes providing a changeable graphical representation 220 of the first value and a changeable textual representation 225 of the first value through the graphical user interface 145. The series of operations includes receiving, by the device and through the graphical user interface 145, a changing of the first value to a second value, where the changing of the first value to the second value is based on receiving a change to the changeable graphical representation 220 of the first value (e.g., receiving the input 235). The series of operations includes transmitting, by the device and to the first application, the second value in the first machine language. The series of operations includes receiving, by the device and from a second application (e.g., the financial modeling application software 120*b*), a third value (e.g., an interest rate value) in a second machine language (e.g., Java). The series of operations includes converting, by the device, the third value in the second machine language to the format. The series of operations includes providing, by the device and through the graphical user interface 145, the third value using the format, where providing the third value using the format includes providing a changeable graphical representation 220 of the third value and a changeable textual representation 225 of the third value. The series of operations includes receiving, by the device and through the graphical user interface, a changing of the third value to a fourth value, where the changing of the third value to the fourth value is based on receiving a change to the changeable graphical representation 220 of the third value (e.g., receiving the input 235). The series of operations includes transmitting, by the device and to the second application, the fourth value in the second machine language.

For the example series of operations, the universal parameter management application may translate multiple sets of changeable parameters into a common format, common machine language, and/or common language script. The user device may then provide each of the multiple sets through a common, changeable graphical representation of the changeable parameters on a graphical user interface of the device. The user may change each of the multiple sets of changeable parameters through an input that changes the changeable graphical representation.

In this way, idle time of the user device and/or host computing systems hosting the multiple software applications may be reduced relative to techniques and apparatuses that accommodate changes to the multiple sets of parameters using different formats, different machine languages, and/or different language scripts. Additionally, an accuracy of changes to the multiple sets of changeable parameters may increase to reduce a need for re-entering changes to the multiple sets of changeable parameters and/or re-running the multiple software applications. As a result, an overall computing efficiency of the user device and/or the remote computing systems may increase.

The number and arrangement of devices shown in FIGS. 3A-3C are provided as one or more examples. In practice, there may be additional devices, fewer devices, different devices, or differently arranged devices than those shown in FIGS. 3A-3C. Furthermore, two or more devices shown in FIGS. 3A-3C may be implemented within a single device, or a single device shown in FIGS. 3A-3C may be implemented as multiple, distributed devices. Additionally, or alternatively, one or more functions being described as being performed by an application or module (e.g., universal parameter management application 150 including the application software access module 155, the parameter visual representation module 160, and/or the graphical user interface tracking module 165) may be performed by another application or module of the implementation 300.

FIG. 4 is a diagram of an example environment 400 in which systems and/or methods described herein may be implemented. As shown in FIG. 4, environment 400 may include the application server 110, which may include one or more elements of and/or may execute within a cloud computing system 405 (e.g., a cloud environment). The cloud computing system 405 may include one or more elements 410-455, as described in more detail below. As further shown in FIG. 4, environment 400 may include the network 105, and devices 115*a*-115*e*. Devices and/or elements of environment 400 may interconnect via wired connections and/or wireless connections.

The cloud computing system 405 may include computing hardware 410, a resource management component 415, a host operating system (OS) 420, and/or one or more virtual computing systems 425. The cloud computing system 405 may execute on, for example, an Amazon Web Services platform, a Microsoft Azure platform, or a Snowflake platform. The resource management component 415 may perform virtualization (e.g., abstraction) of computing hardware 410 to create the one or more virtual computing systems 425. Using virtualization, the resource management component 415 enables a single computing device (e.g., a computer or a server) to operate like multiple computing devices, such as by creating multiple isolated virtual computing systems 425 from computing hardware 410 of the single computing device. In this way, computing hardware 410 can operate more efficiently, with lower power consumption, higher reliability, higher availability, higher utilization, greater flexibility, and lower cost than using separate computing devices.

The computing hardware 410 may include hardware and corresponding resources from one or more computing devices. For example, computing hardware 410 may include hardware from a single computing device (e.g., a single server) or from multiple computing devices (e.g., multiple servers), such as multiple computing devices in one or more data centers. As shown, computing hardware 410 may include one or more processors 430, one or more memories 435, and/or one or more networking components 440. Examples of a processor, a memory, and a networking component (e.g., a communication component) are described elsewhere herein.

The resource management component 415 may include a virtualization application (e.g., executing on hardware, such as computing hardware 410) capable of virtualizing computing hardware 410 to start, stop, and/or manage one or more virtual computing systems 425. For example, the resource management component 415 may include a hypervisor (e.g., a bare-metal or Type 1 hypervisor, a hosted or Type 2 hypervisor, or another type of hypervisor) or a virtual machine monitor, such as when the virtual computing systems 425 are virtual machines 445. Additionally, or alternatively, the resource management component 415 may include a container manager, such as when the virtual computing systems 425 are containers 450. In some implementations, the resource management component 415 executes within and/or in coordination with a host operating system 420.

A virtual computing system 425 may include a virtual environment that enables cloud-based execution of operations and/or processes described herein using computing hardware 410. As shown, a virtual computing system 425 may include a virtual machine 445, a container 450, or a hybrid environment 455 that includes a virtual machine and a container, among other examples. A virtual computing system 425 may execute one or more applications using a file system that includes binary files, software libraries, and/or other resources required to execute applications on a guest operating system (e.g., within the virtual computing system 425) or the host operating system 420.

Although the application server 110 may include one or more elements 410-455 of the cloud computing system 405, may execute within the cloud computing system 405, and/or may be hosted within the cloud computing system 405, in some implementations, the application server 110 may not be cloud-based (e.g., may be implemented outside of a cloud computing system) or may be partially cloud-based. For example, the application server 110 may include one or more devices that are not part of the cloud computing system 405 and which may include a standalone server or another type of computing device. The application server 110 may perform one or more operations and/or processes described in more detail elsewhere herein.

The network 105 may include one or more wired and/or wireless networks. For example, the network 105 may include a cellular network (e.g., a 5G telecommunications network), a public land mobile network (PLMN), a local area network (LAN), a wide area network (WAN), a private network, the Internet, and/or a combination of these or other types of networks. The network 105 enables communication among the devices of the environment 400.

The user devices 115*a*-115*e* may each include one or more features of user device 115 as described in connection with FIG. 1. For example, each of the user devices 115*a*-115*e* may include the processor 140 and/or the graphical user interface 145. Additionally, or alternatively, each of the user devices 115*a*-115*e* may include the universal parameter management application 150 including the application software access module 155, the parameter visual representation module 160, and/or the graphical user interface tracking module 165.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the environment 400 may perform one or more functions described as being performed by another set of devices of the environment 400.

Figure 5:
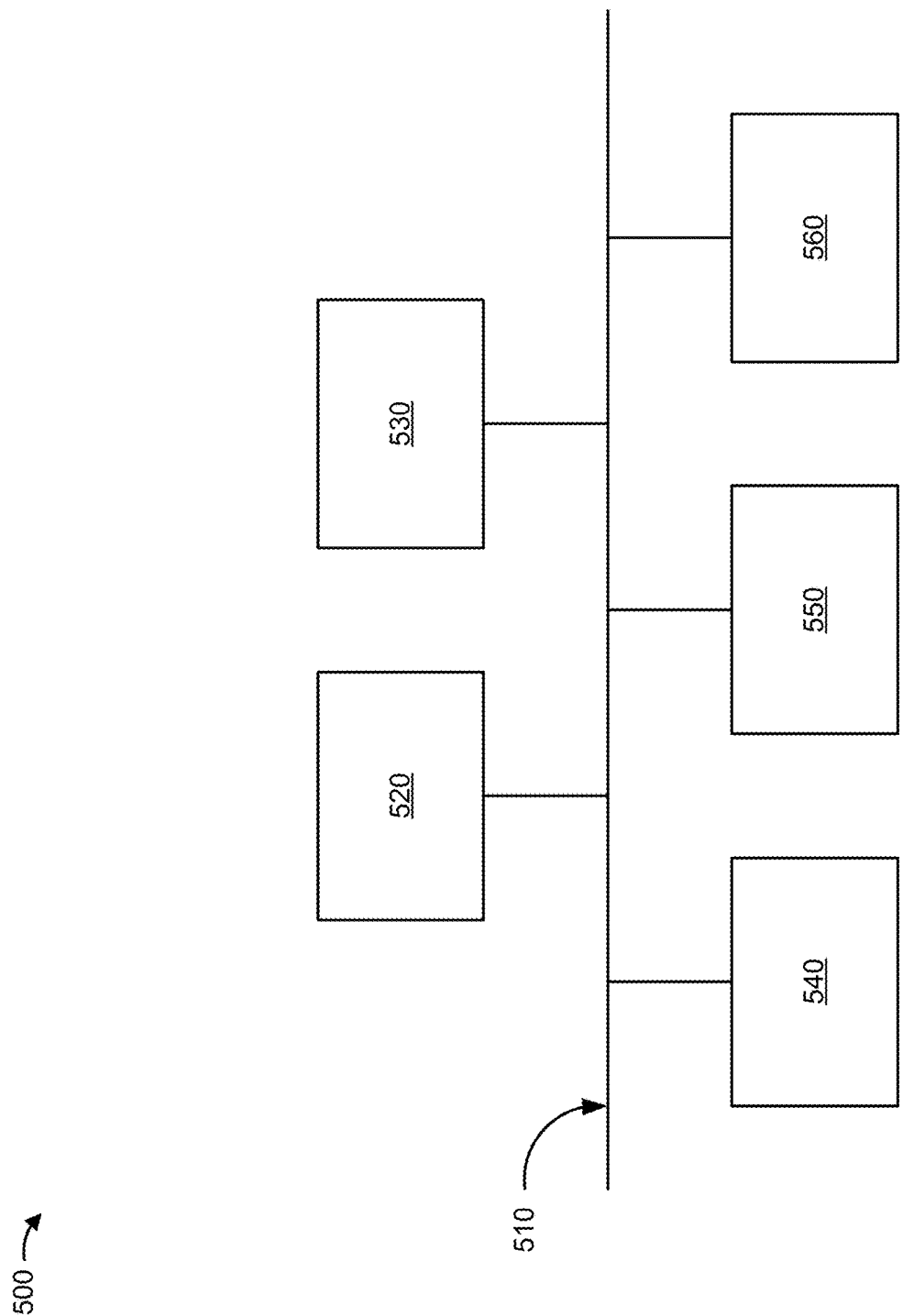
FIG. 5 is a diagram of example components of a device associated with software parameter management through a universal interface described herein.

FIG. 5 is a diagram of example components of a device 500 associated with software parameter management using a universal interface. The device 500 may correspond to network 105, the application server 110, the user device 115, and/or one or more devices of the cloud computing system 405. In some implementations, the application server 110, the network 105, the user device 115, and/or the cloud computing system 405 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
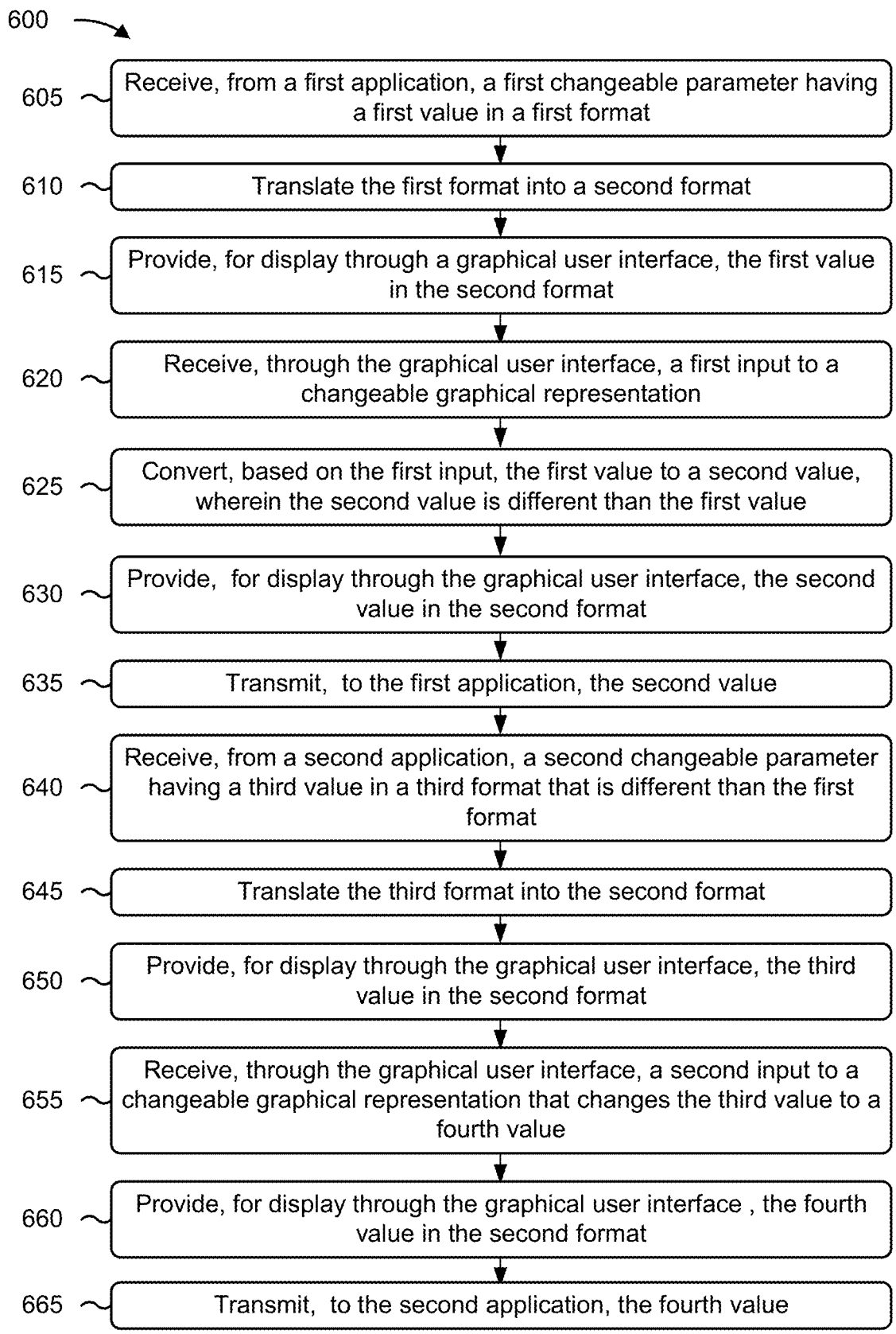
FIGS. 6 and 7 are flowcharts of example processes associated with software parameter management using a universal interface described herein.

FIG. 6 is a flowchart of an example process 600 associated with software parameter management using a universal interface. In some implementations, one or more process blocks of FIG. 6 are performed by the user device 115. In some implementations, one or more process blocks of FIG. 6 are performed by another device or a group of devices separate from or included in the user device 115, such as the application server 110, the application software 120, and/or the universal parameter management application 150. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving, from a first application, a first changeable parameter having a first value in a first format (block 605). For example, the user device 115 may receive, from a first application, a first changeable parameter having a first value in a first format, as described above.

As further shown in FIG. 6, process 600 may include translating the first format into a second format, wherein the second format includes a changeable graphical representation of the first value and a changeable textual representation of the first value (block 610). For example, the user device 115 may translate the first format into a second format, as described above. In some implementations, the second format includes a changeable graphical representation of the first value and a changeable textual representation of the first value.

As further shown in FIG. 6, process 600 may include providing, for display through a graphical user interface, the first value in the second format (block 615). For example, the user device 115 may provide, for display through a graphical user interface, the first value in the second format, as described above.

As further shown in FIG. 6, process 600 may include receiving, through the graphical user interface, a first input to the changeable graphical representation (block 620). For example, the user device 115 may receive, through the graphical user interface, a first input to the changeable graphical representation, as described above.

As further shown in FIG. 6, process 600 may include converting, based on the first input, the first value to a second value (block 625). For example, the user device 115 may convert, based on the first input, the first value to a second value, as described above. In some implementations, the second value is different than the first value.

As further shown in FIG. 6, process 600 may include providing, for display through the graphical user interface, the second value in the second format (block 630). For example, the user device 115 may provide, for display through the graphical user interface, the second value in the second format, as described above.

As further shown in FIG. 6, process 600 may include transmitting, to the first application, the second value (block 635). For example, the user device 115 may transmit, to the first application, the second value, as described above.

As further shown in FIG. 6, process 600 may include receiving, from a second application, a second changeable parameter having a third value in a third format that is different than the first format (block 640). For example, the user device 115 may receive, from a second application, a second changeable parameter having a third value in a third format that is different than the first format, as described above.

As further shown in FIG. 6, process 600 may include translating the third format into the second format (block 645). For example, the user device 115 may translate the third format into the second format, as described above.

As further shown in FIG. 6, process 600 may include providing, for display through the graphical user interface, the third value in the second format (block 650). For example, the user device 115 may provide, for display through the graphical user interface, the third value in the second format, as described above.

As further shown in FIG. 6, process 600 may include receiving, through the graphical user interface, a second input to the changeable graphical representation that changes the third value to a fourth value (block 655). For example, the user device 115 may receive, through the graphical user interface, a second input to the changeable graphical representation that changes the third value to a fourth value, as described above.

As further shown in FIG. 6, process 600 may include providing, for display through the graphical user interface, the fourth value in the second format (block 660). For example, the user device 115 may provide, for display through the graphical user interface, the fourth value in the second format, as described above.

As further shown in FIG. 6, process 600 may include transmitting, to the second application, the fourth value (block 665). For example, the user device 115 may transmit, to the second application, the fourth value, as described above.

Process 600 may include additional implementations, such as any single implementation or any combination of implementations described below and/or in connection with one or more other processes described elsewhere herein.

In a first implementation, the changeable graphical representation includes a geometric shape, and wherein the first input to the changeable graphical representation that changes the first value to a second value changes an area of the geometric shape.

In a second implementation, alone or in combination with the first implementation, the changeable graphical representation includes a marker on a slide bar, and where the first input to the changeable graphical representation that changes the first value to a second value changes a location of the marker on the slide bar.

In a third implementation, alone or in combination with one or more of the first and second implementations, the changeable graphical representation includes a selectable color, and where the first input to the changeable graphical representation that changes the first value to the second value changes the selectable color.

In a fourth implementation, alone or in combination with one or more of the first through third implementations, receiving the first changeable parameter having the first value in the first format includes receiving a textual description of the first changeable parameter, and where providing the first value in the second format includes providing a textual description of the first changeable parameter.

In a fifth implementation, alone or in combination with one or more of the first through fourth implementations, receiving the first changeable parameter having the first value in the first format includes receiving a textual description of the first changeable parameter in a first language script, and where providing the first value in the second format includes translating the textual description from the first language script into a second language script and providing the textual description of the first changeable parameter in the second language script.

In a sixth implementation, alone or in combination with one or more of the first through fifth implementations, providing the third value and the fourth value in the second format includes providing a textual description of the second changeable parameter, where the textual description of the second changeable parameter is different than the textual description of the first changeable parameter.

In a seventh implementation, alone or in combination with one or more of the first through sixth implementations, the first value corresponds to a range of values.

In an eighth implementation, alone or in combination with one or more of the first through seventh implementations, process 600 includes providing, by the device and for display through the graphical user interface, a ranking including the first changeable parameter and/or the second changeable parameter.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
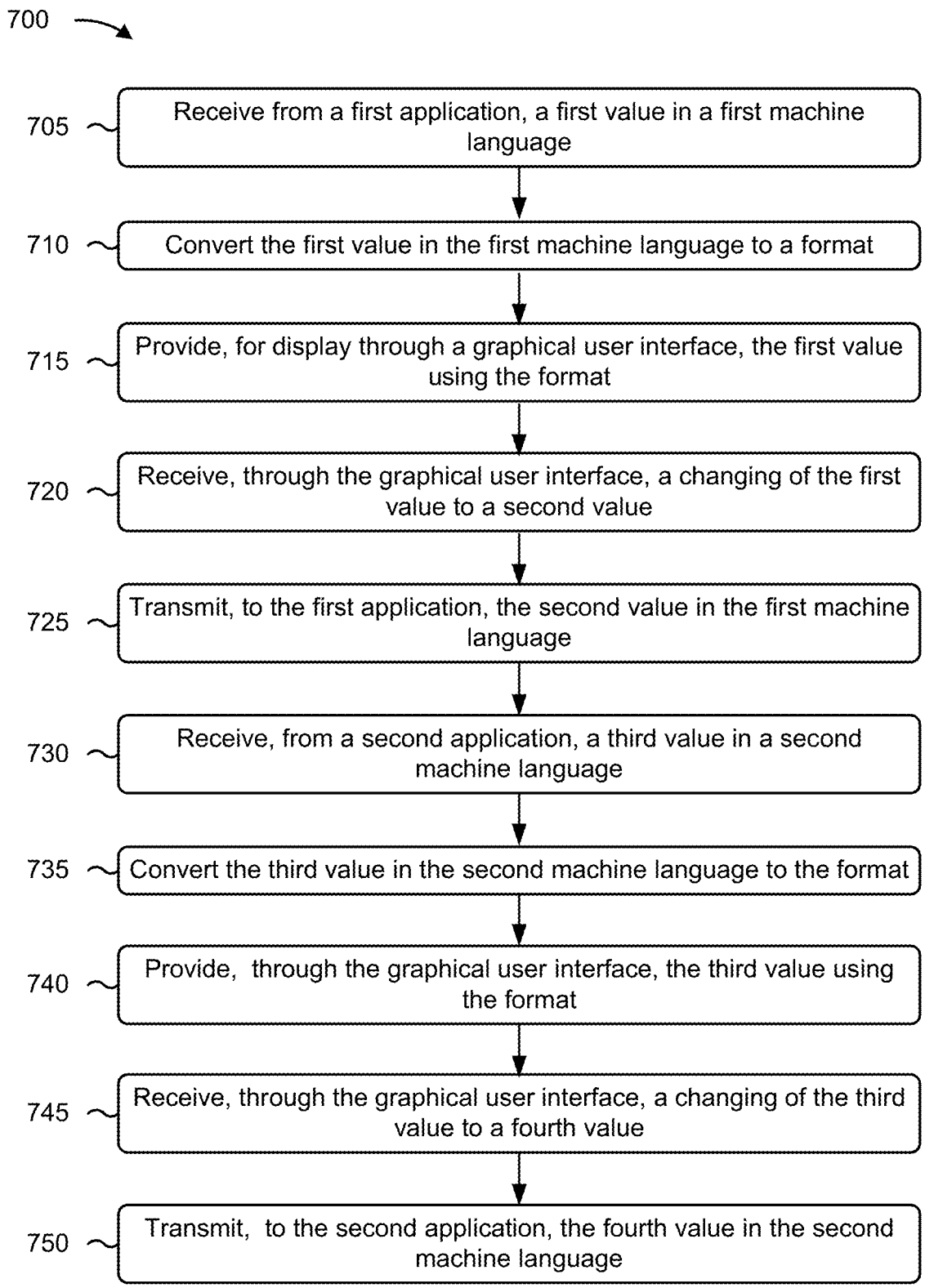

FIG. 7 is a flowchart of an example process 700 associated with software parameter management using a universal interface. In some implementations, one or more process blocks of FIG. 7 are performed by the user device 115. In some implementations, one or more process blocks of FIG. 7 are performed by another device or a group of devices separate from or included in the user device 115, such as the application server 110, the application software 120, and/or the universal parameter management application 150. Additionally, or alternatively, one or more process blocks of FIG. 7 may be performed by one or more components of device 500, such as processor 520, memory 530, input component 540, output component 550, and/or communication component 560.

As shown in FIG. 7, process 700 may include receiving, from a first application, a first value in a first machine language (block 705). For example, the user device 115 may receive, from a first application, a first value in a first machine language, as described above.

As further shown in FIG. 7, process 700 may include converting the first value in the first machine language to a format (block 710). For example, the user device 115 may convert the first value in the first machine language to a format, as described above.

As further shown in FIG. 7, process 700 may include providing, for display through a graphical user interface, the first value using the format (block 715). For example, the user device 115 may provide, for display through a graphical user interface, the first value using the format, as described above. In some implementations, providing the first value using the format includes providing a changeable graphical representation of the first value and a changeable textual representation of the first value through the graphical user interface.

As further shown in FIG. 7, process 700 may include receiving, through the graphical user interface, a changing of the first value to a second value (block 720). For example, the user device 115 may receive, through the graphical user interface, a changing of the first value to a second value as described above. In some implementations, the changing of the first value to the second value is based on receiving a change to the changeable graphical representation of the first value.

As further shown in FIG. 7, process 700 may include transmitting, to the first application, the second value in the first machine language (block 725). For example, the user device 115 may transmit, to the first application, the second value in the first machine language, as described above.

As further shown in FIG. 7, process 700 may include receiving, from a second application, a third value in a second machine language (block 730). For example, the user device 115 may receive, from a second application, a third value in a second machine language, as described above.

As further shown in FIG. 7, process 700 may include converting the third value in the second machine language to the format (block 735). For example, the user device 115 may convert the third value in the second machine language to the format, as described above.

As further shown in FIG. 7, process 700 may include providing, through the graphical user interface, the third value using the format (block 740). For example, the user device 115 may provide, through the graphical user interface, the third value using the format, as described above. In some implementations, providing the third value using the format includes providing a changeable graphical representation of the third value and a changeable textual representation of the third value.

As further shown in FIG. 7, process 700 may include receiving, through the graphical user interface, a changing of the third value to a fourth value (block 745). For example, the user device 115 may receive, through the graphical user interface, a changing of the third value to a fourth value, as described above. In some implementations, the changing of the third value to the fourth value is based on receiving a change to the changeable graphical representation of the third value.

As further shown in FIG. 7, process 700 may include transmitting, to the second application, the fourth value in the second machine language (block 750). For example, the user device 115 may transmit, to the second application, the fourth value in the second machine language, as described above.

Process 700 may include additional implementations, such as any single implementation or any combination of implementations described below and/or in connection with one or more other processes described elsewhere herein.

In a first implementation, the changing of the first value to the second value based on receiving the change to the changeable graphical representation of the first value includes receiving the change to the changeable graphical representation of the first value through a mouse-drag or mouse click action to the graphical user interface providing the changeable graphical representation of the first value.

In a second implementation, the changing of the third value to the fourth value based on receiving the change to the changeable graphical representation of the third value includes receiving the change to the changeable graphical representation of the third value through a pinch-in or pinch-out action to the graphical user interface providing the changeable graphical representation of the third value.

In a third implementation, providing the first value using the format and providing the third value using the format includes providing the first value using the format and the third value using the format simultaneously.

In a fourth implementation, process 700 includes receiving, by the device, a selection of the format prior to converting the first value in the first machine language to the format.

In a fifth implementation, process 700 includes receiving, by the device and from the first application, a notification that indicates a change of a parameter from the first value to the second value succeeded, and providing, by the device through the graphical user interface, an indication that the change of the parameter from the first value to the second value succeeded.

In a sixth implementation, process 700 includes receiving, by the device and from the first application, a notification that indicates a change of a parameter from the first value to the second value failed, and providing, by the device through the graphical user interface, an indication that the change of the parameter from the first value to the second value failed.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

Some implementations described herein provide techniques and apparatuses for software parameter management through a universal interface. The techniques and apparatuses include a user device including a universal parameter management application. The user device may receive multiple sets of changeable parameters that may be provided to the user device using different formats, different machine languages, and/or different language scripts. The universal parameter management application may translate the multiple sets of changeable parameters into a common format, common machine language, and/or common language script. The user device may then provide each of the multiple sets through a common, changeable graphical representation of the changeable parameters on a graphical user interface of the device. The user may change each of the multiple sets of changeable parameters through an input that changes the common, changeable graphical representation.

In this way, idle time of the user device and/or host computing systems hosting the multiple software applications may be reduced relative to techniques and apparatuses that accommodate changes to the multiple sets of parameters using different formats, different machine languages, and/or different language scripts. Additionally, an accuracy of changes to the multiple sets of changeable parameters may increase to reduce a need for re-entering changes to the multiple sets of changeable parameters and/or re-running the multiple software applications. As a result, an overall computing efficiency of the user device and/or the host computing systems may increase.

As described in greater detail above, some implementations described herein provide a method. The method includes receiving, by a device and from a first application, a first changeable parameter having a first value in a first format. The method includes translating, by the device, the first format into a second format, where the second format includes a changeable graphical representation of the first value and a changeable textual representation of the first value. The method includes providing, by the device and for display through a graphical user interface, the first value in the second format. The method includes receiving, by the device and through the graphical user interface, a first input to the changeable graphical representation. The method includes converting, by the device and based on the first input, the first value to a second value, where the second value is different than the first value. The method includes providing, by the device and for display through the graphical user interface, the second value in the second format. The method includes transmitting, by the device and to the first application, the second value. The method includes receiving, by the device and from a second application, a second changeable parameter having a third value in a third format that is different than the first format. The method includes translating, by the device, the third format into the second format. The method includes providing, by the device and for display through the graphical user interface, the third value in the second format. The method includes receiving, by the device and through the graphical user interface, a second input to the changeable graphical representation that changes the third value to a fourth value. The method includes providing, by the device and for display through the graphical user interface, the fourth value in the second format. The method includes transmitting, by the device and to the second application, the fourth value.

As described in greater detail above, some implementations described herein provide a non-transitory computer-readable medium that stores a set of instructions. The set of instructions includes one or more instructions that, when executed by one or more processors of a device, cause the device to receive, from a first application, a first value in a first machine language, convert the first value in the first machine language to a format, and provide, for display through a graphical user interface, the first value using the format. In some implementations, the one or more instructions, that cause the device to provide the first value using the format, cause the device to provide a changeable graphical representation of the first value and a changeable textual representation of the first value through the graphical user interface. The one or more instructions, when executed by the one or more processors, further cause the device to receive, through the graphical user interface, a change of the first value to a second value. In some implementations, the change of the first value to the second value is based on receiving a change to the changeable graphical representation of the first value. The one or more instructions, when executed by the one or more processors, further cause the device to transmit, to the first application, the second value in the first machine language and receive, from a second application, a third value in a second machine language. The one or more instructions, when executed by the one or more processors, further cause the device to convert the third value in the second machine language to the format and provide, through the graphical user interface, the third value using the format. In some implementations, the one or more instructions, that cause the device to provide the third value using the format, cause the device to provide a changeable graphical representation of the third value and a changeable textual representation of the third value. The one or more instructions, when executed by the one or more processors, further cause the device to receive, through the graphical user interface, a change of the third value to a fourth value. In some implementations, the change of the third value to the fourth value is based on receiving a change to the changeable graphical representation of the third value. The one or more instructions, when executed by the one or more processors, further cause the device to transmit, to the second application, the fourth value in the second machine language.

As described in greater detail above, some implementations described herein provide a device. The device includes one or more memories. The device includes one or more processors, coupled to the one or more memories, configured to, receive, from an application, a set of changeable parameters and provide, through a graphical user interface, the set of changeable parameters in a format that includes a changeable graphical representation. In some implementations, a first value of the set of changeable parameters corresponds to a first attribute of the changeable graphical representation. In some implementations, a second value of the set of changeable parameters corresponds to a second attribute of the changeable graphical representation receive. The one or more processors are further configured to provide, through the graphical user interface, a change to the changeable graphical representation that changes the first value of the set of changeable parameters to a third value and that changes the second value of the set of changeable parameters to a fourth value and to transmit, to the application, the third value and the fourth value.

As used herein, the term "and/or," when used in connection with a plurality of items, is intended to cover each of the plurality of items alone and any and all combinations of the plurality of items. For example, "A and/or B" covers "A and B," "A and not B," and "B and not A."

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

The foregoing outlines features of several implementations so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the implementations introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   receiving, by a device and from a first application, a data packet comprising:
     a first changeable parameter having a first value in a first format, and
     an upper threshold and a lower threshold that each corresponds to the first changeable parameter;
   translating, by the device, the first format into a second format,
     wherein the second format comprises a changeable graphical representation of the first value and a changeable textual representation of the first value;
   providing, by the device and for display through a graphical user interface, the first value in the second format;
   receiving, by the device and through the graphical user interface, a drag input to the changeable graphical representation, wherein the drag input is bound by a maximum scaling size of the changeable graphical representation and a minimum scaling size of the changeable graphical representation, wherein the maximum scaling size is associated with the upper threshold and the minimum scaling size is associated with the lower threshold;
   converting, by the device and based on the drag input, the first value to a second value,
     wherein the second value is different than the first value and is based on a magnitude of a size change to the changeable graphical representation from the drag input;
   providing, by the device and for display through the graphical user interface, the second value in the second format;
   transmitting, by the device and to the first application, the second value;
   receiving, by the device and from a second application, a second changeable parameter having a third value in a third format that is different than the first format;
   translating, by the device, the third format into the second format;
   providing, by the device and for display through the graphical user interface, the third value in the second format;
   receiving, by the device and through the graphical user interface, a second input to the changeable graphical representation that changes the third value to a fourth value;
   providing, by the device and for display through the graphical user interface, the fourth value in the second format; and
   transmitting, by the device and to the second application, the fourth value.

2. The method of claim 1, wherein the changeable graphical representation comprises:
   a geometric shape, and
   wherein the drag input to the changeable graphical representation that converts the first value to the second value changes an area of the geometric shape.

3. The method of claim 1, wherein the changeable graphical representation comprises:
   a marker on a slide bar, and
   wherein the drag input to the changeable graphical representation that converts the first value to the second value changes a location of the marker on the slide bar.

4. The method of claim 1, wherein the changeable graphical representation comprises:
   a selectable color, and
   wherein the drag input to the changeable graphical representation that converts the first value to the second value changes the selectable color.

5. The method of claim 1, wherein the first changeable parameter having the first value in the first format comprises a textual description of the first changeable parameter, and
   wherein providing the first value in the second format comprises:
     providing the textual description of the first changeable parameter.

6. The method of claim 5, wherein the textual description of the first changeable parameter is a first textual description in a first language script, and
   wherein providing the textual description of the first changeable parameter comprises:
     translating the textual description from the first language script into a second language script, and
     providing the textual description of the first changeable parameter in the second language script.

7. The method of claim 5, wherein providing the third value and the fourth value in the second format comprises:
   providing a textual description of the second changeable parameter,
     wherein the textual description of the second changeable parameter is different than the textual description of the first changeable parameter.

8. The method of claim 1, wherein the first value corresponds to a first attribute of the changeable graphical representation.

9. The method of claim 1, further comprising:
providing, by the device and for display through the graphical user interface, a ranking including the first changeable parameter and/or the second changeable parameter.

10. A non-transitory computer-readable medium storing a set of instructions, the set of instructions comprising:
one or more instructions that, when executed by one or more processors of a device, cause the device to:
receive, from a first application, a data packet comprising:
a first value in a first machine language, and
an upper threshold and a lower threshold that each corresponds to the first value;
convert the first value in the first machine language to a format;
provide, for display through a graphical user interface, the first value using the format,
wherein the one or more instructions, that cause the device to provide the first value using the format, cause the device to provide a changeable graphical representation of the first value and a changeable textual representation of the first value through the graphical user interface;
receive, through the graphical user interface and via a drag input to the changeable graphical representation of the first value, a change of the first value to a second value,
wherein the drag input is bound by a maximum scaling size of the changeable graphical representation and a minimum scaling size of the changeable graphical representation, the maximum scaling size being associated with the upper threshold and the minimum scaling size being associated with the lower threshold, and
wherein the change of the first value to the second value is based on a magnitude of a size change to the changeable graphical representation of the first value;
transmit, to the first application, the second value in the first machine language;
receive, from a second application, a third value in a second machine language;
convert the third value in the second machine language to the format;
provide, through the graphical user interface, the third value using the format,
wherein the one or more instructions, that cause the device to provide the third value using the format, cause the device to provide a changeable graphical representation of the third value and a changeable textual representation of the third value;
receive, through the graphical user interface, a change of the third value to a fourth value,
wherein the change of the third value to the fourth value is based on receiving a change to the changeable graphical representation of the third value; and
transmit, to the second application, the fourth value in the second machine language.

11. The non-transitory computer-readable medium of claim 10, wherein the one or more instructions, that cause the device to receive the change of the first value to the second value based on receiving the change to the changeable graphical representation of the first value, cause the device to:
receive the change to the changeable graphical representation of the first value through a mouse-drag or mouse click action to the graphical user interface providing the changeable graphical representation of the first value.

12. The non-transitory computer-readable medium of claim 10, wherein the one or more instructions, that cause the device to receive the change of the third value to the fourth value based on receiving the change to the changeable graphical representation of the third value, cause the device to:
receive the change to the changeable graphical representation of the third value through a pinch-in or pinch-out action to the graphical user interface providing the changeable graphical representation of the third value.

13. The non-transitory computer-readable medium of claim 10, wherein the one or more instructions, that cause the device to provide the first value using the format and providing the third value using the format, cause the device to:
provide the first value using the format and the third value using the format simultaneously.

14. The non-transitory computer-readable medium of claim 10, wherein the one or more instructions further cause the device to:
receive a selection of the format prior to converting the first value in the first machine language to the format.

15. The non-transitory computer-readable medium of claim 10, wherein the one or more instructions further cause the device to:
receive, from the first application, a notification that indicates a change of a parameter from the first value to the second value succeeded, and
provide an indication that the change of the parameter from the first value to the second value succeeded.

16. The non-transitory computer-readable medium of claim 10, wherein the one or more instructions further cause the device to:
receive, from the first application, a notification that indicates a change of a parameter from the first value to the second value failed, and
provide an indication that the change of the parameter from the first value to the second value failed.

17. A device, comprising:
one or more memories; and
one or more processors, coupled to the one or more memories, configured to:
receive, from an application, a set of changeable parameters, an upper threshold, and a lower threshold, wherein the set of changeable parameters includes a first value and a second value, wherein the upper threshold and the lower threshold each corresponds to at least one of the first value or the second value;
provide, through a graphical user interface, the set of changeable parameters in a format that includes a changeable graphical representation,
wherein the first value of the set of changeable parameters corresponds to a first attribute of the changeable graphical representation, and
wherein the second value of the set of changeable parameters corresponds to a second attribute of the changeable graphical representation;
receive, through the graphical user interface, a size change to the changeable graphical representation that changes the first value of the set of changeable parameters to a third value and that changes the second value of the set of changeable parameters to a fourth value, wherein at least one of the third value or the fourth value is based on a magnitude of the size change to the changeable graphical representation, wherein the size change to at least one of the first value or the second value is bound by a maximum scaling size of the changeable graphical representation and a minimum scaling size of the changeable graphical representation, wherein the maximum scaling size is associated with the upper threshold and the minimum scaling size is associated with the lower threshold; and transmit, to the application, the third value and the fourth value.

18. The device of claim 17, wherein the one or more processors, to receive the set of changeable parameters, are configured to:

receive the set of changeable parameters in a first format, and wherein the one or more processors, to provide the set of changeable parameters in the format, are further configured to:

provide the set of changeable parameters in a second format that is different than the first format.

19. The device of claim 17, wherein the one or more processors, to receive the set of changeable parameters, are configured to:

receive the set of changeable parameters in a first machine language, and wherein the one or more processors are further configured to:

convert the set of changeable parameters into a second machine language that is different than the first machine language.

20. The device of claim 17, wherein the set of changeable parameters corresponds to a first set of changeable parameters, the changeable graphical representation corresponds to a first changeable graphical representation, and wherein the one or more processors are further configured to:

simultaneously provide, in the format, the first changeable graphical representation along with a second changeable graphical representation corresponding to values of a second set of changeable parameters.

* * * * *